(12) United States Patent
Lee et al.

(10) Patent No.: US 12,488,616 B2
(45) Date of Patent: Dec. 2, 2025

(54) DISPLAY DEVICE

(71) Applicant: Samsung Display Co., Ltd., Yongin-Si (KR)

(72) Inventors: Hyun Dae Lee, Yongin-si (KR); Il Nam Kim, Yongin-si (KR); Hyoung Wook Jang, Yongin-si (KR); Kang Bin Jo, Yongin-si (KR); Go Eun Cha, Yongin-si (KR); Hee Chul Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 138 days.

(21) Appl. No.: 18/374,547

(22) Filed: Sep. 28, 2023

(65) Prior Publication Data

US 2024/0135744 A1 Apr. 25, 2024
US 2024/0233435 A9 Jul. 11, 2024

(30) Foreign Application Priority Data

Oct. 20, 2022 (KR) .................. 10-2022-0135359

(51) Int. Cl.
*G06V 40/13* (2022.01)
*G06F 1/16* (2006.01)
*G06V 40/12* (2022.01)

(52) U.S. Cl.
CPC ........ *G06V 40/1318* (2022.01); *G06F 1/1643* (2013.01); *G06V 40/1341* (2022.01); *G06V 40/1365* (2022.01); *G06V 2201/07* (2022.01)

(58) Field of Classification Search
CPC ........... G06V 40/1318; G06V 40/1341; G06V 40/1365; G06V 2201/07; G06F 1/1643; G06F 3/0412; G06F 3/04166; G06F 3/0443; G06F 3/0446; G06F 2203/04111; H10K 59/40; H10K 59/12; H10K 59/60; G09G 3/30; G09G 3/3208; G09G 2300/0408;

(Continued)

(56) References Cited

U.S. PATENT DOCUMENTS

2021/0073504 A1\* 3/2021 Shih .................. G09G 3/20
2021/0407453 A1\* 12/2021 Shih .................. G09G 3/3648

(Continued)

FOREIGN PATENT DOCUMENTS

KR 10-2023-0157565 A 11/2023

*Primary Examiner* — Jonathan A Boyd
(74) *Attorney, Agent, or Firm* — Innovation Counsel LLP

(57) ABSTRACT

A display device comprises a display panel comprising an image display area and a non-display area, display pixels comprising light-emitting elements in the image display area and pixel driving units connected to the light-emitting elements, light-sensing pixels comprising photo-detecting units in a fingerprint sensing area in the image display area, and sense driving units connected to the photo-detecting units, a light-sensing reset driver configured to supply reset signals to the sense driving units of the light-sensing pixels for at least each horizontal line among the light-sensing pixels in response to a line select signal from a display driving circuit; and a fingerprint scan driver configured to sequentially supply a fingerprint scan signal to the sense driving units of the light-sensing pixels in response to a fingerprint scan control signal from the display driving circuit.

18 Claims, 21 Drawing Sheets

(58) Field of Classification Search
CPC ..... G09G 2310/0202; G09G 2310/061; G09G 2360/14; G06K 19/0718
See application file for complete search history.

(56) References Cited

U.S. PATENT DOCUMENTS

2022/0012454 A1* 1/2022 Lin ................. G06F 3/0443
2023/0360427 A1  11/2023 Kim et al.

* cited by examiner

2×2 BLOCK

DISPLAY DEVICE

This application claims the benefit of Korean Patent Application No. 10-2022-0135359, filed on Oct. 20, 2022, in the Korean Intellectual Property Office, the disclosure of which is incorporated herein in its entirety by reference.

BACKGROUND

1. Field of the Disclosure

The present disclosure relates to a display device.

2. Description of the Related Art

As the information-oriented society evolves, various demands for display devices are ever increasing. Display devices are being employed by a variety of electronic devices such as smart phones, digital cameras, laptop computers, table PCs, navigation devices, and smart televisions.

Recently, as the mobile communications technology evolves, portable electronic devices such as smartphones, tablet PCs and laptop computers are prevailing. Privacy information is stored in portable electronic devices. Accordingly, in order to protect such privacy information stored in portable electronic devices, fingerprint authentication has been used to authenticate a user's fingerprint, which is biometric information.

For example, a display device may recognize and authenticate a user's fingerprint by optical, ultrasonic, capacitive sensing, etc. The optical sensing may authenticate a user's fingerprint by sensing light reflected by a user's fingerprint.

SUMMARY

A display device employs a display panel in which image display pixels and light-sensing pixels are formed on an image display surface to authenticate a user's fingerprint in an optical manner. In such a display device, the light-sensing pixels are driven with the driving frequency of the image display pixels for high resolution. As a result, the light-sensing period and light-sensing accuracy of the light-sensing pixels may be insufficient.

Aspects of the present disclosure provide a display device in which the light-sensing period of the light-sensing pixels for each horizontal or vertical line can be increased to a plurality of frame periods, and a fingerprint can be recognized by sampling the light-sensing data at least every frame.

It should be noted that features of the present disclosure are not limited to the above-mentioned features; and other features of the present disclosure will be apparent to those skilled in the art from the following descriptions.

According to an embodiment of the disclosure, a display device comprises a display panel comprising an image display area and a non-display area, display pixels comprising light-emitting elements in the image display area and pixel driving units connected to the light-emitting elements, light-sensing pixels comprising photo-detecting units in a fingerprint sensing area in the image display area, and sense driving units connected to the photo-detecting units, a light-sensing reset driver configured to supply reset signals to the sense driving units of the light-sensing pixels for at least each horizontal line among the light-sensing pixels in response to a line select signal from a display driving circuit; and a fingerprint scan driver configured to sequentially supply a fingerprint scan signal to the sense driving units of the light-sensing pixels in response to a fingerprint scan control signal from the display driving circuit.

In an embodiment, the light-sensing reset driver sequentially supplies the reset signals to the sense driving units of the light-sensing pixels for at least each horizontal line in response to the line select signals input during a blank period of at least one frame period.

In an embodiment, the sense driving units simultaneously reset the light-sensing pixels for at least each horizontal line in response to reset signals input from the light-sensing reset driver at least every frame, and connect fingerprint connection lines connected to the light-sensing pixels with sensing lines in response to the fingerprint scan signal.

In an embodiment, the sense driving units reset the light-sensing pixels electrically connected thereto to a reset voltage in response to the reset signal input for at least each horizontal line, and drive the light-sensing pixels so that the light-sensing pixels output light-sensing signals in response to the fingerprint scan signal during a plurality of frame periods until a next reset signal is input.

In an embodiment, each of the sense driving units comprises a first sensing transistor configured to allow a light-sensing signal to flow according to a light-sensing current according to voltages of a photo-detecting element and a sensing capacitor of the photo-detecting unit, a second sensing transistor configured to control the light-sensing signal from the first sensing transistor to be transmitted to a fingerprint sensing line in response to the fingerprint scan signal, and a third sensing transistor configured to reset the voltages of the photo-detecting element and the sensing capacitor to a reset voltage of a reset voltage source in response to the reset signal.

In an embodiment, second sensing transistors connected to a $p^{th}$ fingerprint scan line among a plurality of fingerprint scan lines connect the photo-detecting units arranged in a $(4n-3)^{th}$ horizontal line with respective fingerprint sensing lines in response to a $p^{th}$ fingerprint scan signal. Second sensing transistors connected to a (p+1)th fingerprint scan line among the plurality of fingerprint scan lines connect the photo-detecting units arranged in a $(4n-2)^{th}$ horizontal line with respective fingerprint sensing lines in response to a $(p+1)^{th}$ fingerprint scan signal. Second sensing transistors connected to a (p+2)th fingerprint scan line among the plurality of fingerprint scan lines connect the photo-detecting units arranged in a $(4n-1)^{th}$ horizontal line with respective fingerprint sensing lines in response to a $(p+2)^{th}$ fingerprint scan signal. Second sensing transistors connected to a $(p+3)^{th}$ fingerprint scan line among the plurality of fingerprint scan lines connect the photo-detecting units arranged in a 4nth horizontal line with respective fingerprint sensing lines in response to a $(p+3)^{th}$ fingerprint scan signal.

In an embodiment, the light-sensing reset driver comprises first to nth multiplexers, and wherein each of the first to nth multiplexers is connected to $(4n-3)^{th}$ to 4nth fingerprint reset lines connected to the sense driving units, and sequentially apply the reset signals to the $(4n-3)^{th}$ to 4nth fingerprint reset lines in response to the line select signal.

In an embodiment, the display driving circuit supplies the line select signal to the first to nth multiplexers at least every frame period. The line select signal is a digital signal that sequentially selects the $(4n-3)^{th}$ to 4nth fingerprint reset lines in each blank period of the at least one frame period.

In an embodiment, the first to nth multiplexers sequentially supply the (4n−3) to 4nth reset signals to the (4n−3) to 4nth fingerprint reset lines in response to the line select signal sequentially input for each blank period of the at least one frame period.

In an embodiment, the sense driving units are connected to the $(4n-3)^{th}$ to 4nth fingerprint reset lines for each horizontal line, reset the light-sensing pixels electrically connected thereto to a reset voltage in response to the $(4n-3)^{th}$ to 4nth reset signals input for each horizontal line, and drive the light-sensing pixels so that they output light-sensing signals in response to the fingerprint scan signal during a plurality of frame periods until a next reset signal is input.

In an embodiment, the light-sensing reset driver comprises first to nth multiplexers. Each of the first to nth multiplexers is connected to $(6n-5)^{th}$ to 6nth, $(8n-7)$th to 8nth, $(10n-9)^{th}$ to 10nth, $(12n-11)^{th}$ to 12n, $(14n-13)^{th}$ to 14nth, or $(16n-15)^{th}$ to 16nth fingerprint reset lines connected to the sense driving units, and sequentially applies the reset signals to the $(6n-5)^{th}$ to the 6nth, the $(8n-7)$th to the 8nth, the $(10n-9)^{th}$ to the 10nth, the $(12n-11))^{th}$ to the 12nth, the $(14n-13)^{th}$ to the 14nth, or the $(16n-15)^{th}$ to the 16nth fingerprint reset lines in response to the line select signal.

In an embodiment, the display driving circuit supplies the line select signal to the first to nth multiplexers at least every frame period. The line select signal is a digital signal that sequentially selects the $(6n-5)^{th}$ to the 6nth, the $(8n-7)^{th}$ to the 8nth, the $(10n-9)^{th}$ to the 10nth, the $(12n-11)^{th}$ to the 12nth, the $(14n-13)^{th}$ to the 14nth, or the $(16n-15)$th to the 16nth fingerprint reset lines in each blank period of the at least one frame period.

In an embodiment, the sense driving units are connected to the $(6n-5)^{th}$ to the 6nth, the $(8n-7)^{th}$ to the 8nth, the $(10n-9)^{th}$ to the 10nth, the $(12n-11)^{th}$ to the 12nth, the $(14n-13)$th to the 14nth, or the $(16n-15)^{th}$ to the 16nth fingerprint reset lines for each horizontal line, reset the light-sensing pixels electrically connected thereto to a reset voltage in response to the $(6n-5)^{th}$ to the 6nth, the $(8n-7)^{th}$ to the 8nth, the $(10n-9)^{th}$ to the 10nth, the $(12n-11)^{th}$ to the 12nth, the $(14n-13)^{th}$ to the 14nth, or the $(16n-15)^{th}$ to the 16nth reset signals input for each horizontal line, and drive the light-sensing pixels so that they output light-sensing signals in response to the fingerprint scan signal during a plurality of frame periods until a next reset signal is input.

In an embodiment, the display device further comprises: a fingerprint driving circuit configured to perform analog-digital conversion at least every frame on light-sensing signals or sensing voltages input through fingerprint sensing lines connected to the sense driving units, respectively, to generate light-sensing data, and recognize a fingerprint using the light-sensing data.

In an embodiment, the light-sensing reset driver sequentially supplies the reset signals to the sense driving units of the light-sensing pixels for at least each horizontal line in response to the line select signals input during a blank period of at least one frame period.

In an embodiment, the light-sensing reset driver comprises first to nth multiplexers. Each of the first to nth multiplexers is connected to $(4n-3)^{th}$ to 4th, $(6n-5)^{th}$ to 6nth, $(8n-7)^{th}$ to 8nth, $(10n-9)^{th}$ to 10nth, $(12n-11)^{th}$ to 12nth, $(14n-13)^{th}$ to 14nth, or $(16n-15)^{th}$ to 16nth fingerprint reset lines connected to the sense driving units, and sequentially applies the reset signals to the $(4n-3)^{th}$ to the 4th, the $(6n-5)$th to the 6nth, the $(8n-7)^{th}$ to the 8nth, the $(10n-9)^{th}$ to the 10nth, the $(12n-11)^{th}$ to the 12nth, the $(14n-13)$th to the 14nth, or the $(16n-15)^{th}$ to the 16nth fingerprint reset lines in response to the line select signal.

In an embodiment, the display driving circuit supplies the line select signal to the first to nth multiplexers at least every frame period. The line select signal is a digital signal that sequentially selects the $(4n-3)$th to the 4th, the $(6n-5)$th to the 6nth, the $(8n-7)^{th}$ to the 8nth, the $(10n-9)^{th}$ to the 10nth, the $(12n-11)^{th}$ to the 12nth, the $(14n-13)$th to the 14nth, or the $(16n-15)^{th}$ to the 16nth fingerprint reset lines in each blank period of the at least one frame period.

In an embodiment, the sense driving units are connected to the $(4n-3)^{th}$ to the 4th, the $(6n-5)^{th}$ to the 6nth, the $(8n-7)^{th}$ to the 8nth, the $(10n-9)^{th}$ to the 10nth, the $(12n-11)^{th}$ to the 12nth, the $(14n-13)^{th}$ to the 14nth, or the $(16n-15)^{th}$ to the 16nth fingerprint reset lines for each horizontal line, reset the light-sensing pixels electrically connected thereto to a reset voltage in response to the $(4n-3)^{th}$ to the 4th, the $(6n-5)$th to the 6nth, the $(8n-7)^{th}$ to the 8nth, the $(10n-9)^{th}$ to the 10nth, the $(12n-11)^{th}$ to the 12nth, the $(14n-13)^{th}$ to the 14nth, or the $(16n-15)^{th}$ to the 16nth reset signals input for each horizontal line, and drive the light-sensing pixels so that they output light-sensing signals in response to the fingerprint scan signal during a plurality of frame periods until a next reset signal is input.

In an embodiment, the fingerprint driving circuit samples the light-sensing data for at least one frame from the light-sensing data for a plurality of frame periods for each horizontal line, detects the sampling sensing data, and authenticates a fingerprint by combining the sampling sensing data for each horizontal line.

In an embodiment, the fingerprint driving circuit divides the fingerprint sensing area in the image display area into a plurality of divided areas, calculates averages of data values of the light-sensing data or sampling sensing data for the divided areas, and combines the averages of the data values for each horizontal line to authenticate a fingerprint.

According to an embodiment of the present disclosure, a light-sensing period of light-sensing pixels can be increased and a fingerprint can be recognized by sampling light-sensing data, thereby increasing the light-sensing period and light-sensing accuracy of a display device.

In addition, according to an embodiment of the present disclosure, a fingerprint sensing area for sensing a fingerprint is divided into a plurality of divided areas, and average values of light-sensing data for the divided areas are used, so that the accuracy of sensing a fingerprint of the display device can be improved while reducing noise.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings.

DETAILED DESCRIPTION OF THE EMBODIMENTS

The inventive concept will now be described more fully hereinafter with reference to the accompanying drawings, in which embodiments are shown. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the inventive concept. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described with reference to the accompanying drawings.

Figure 1:
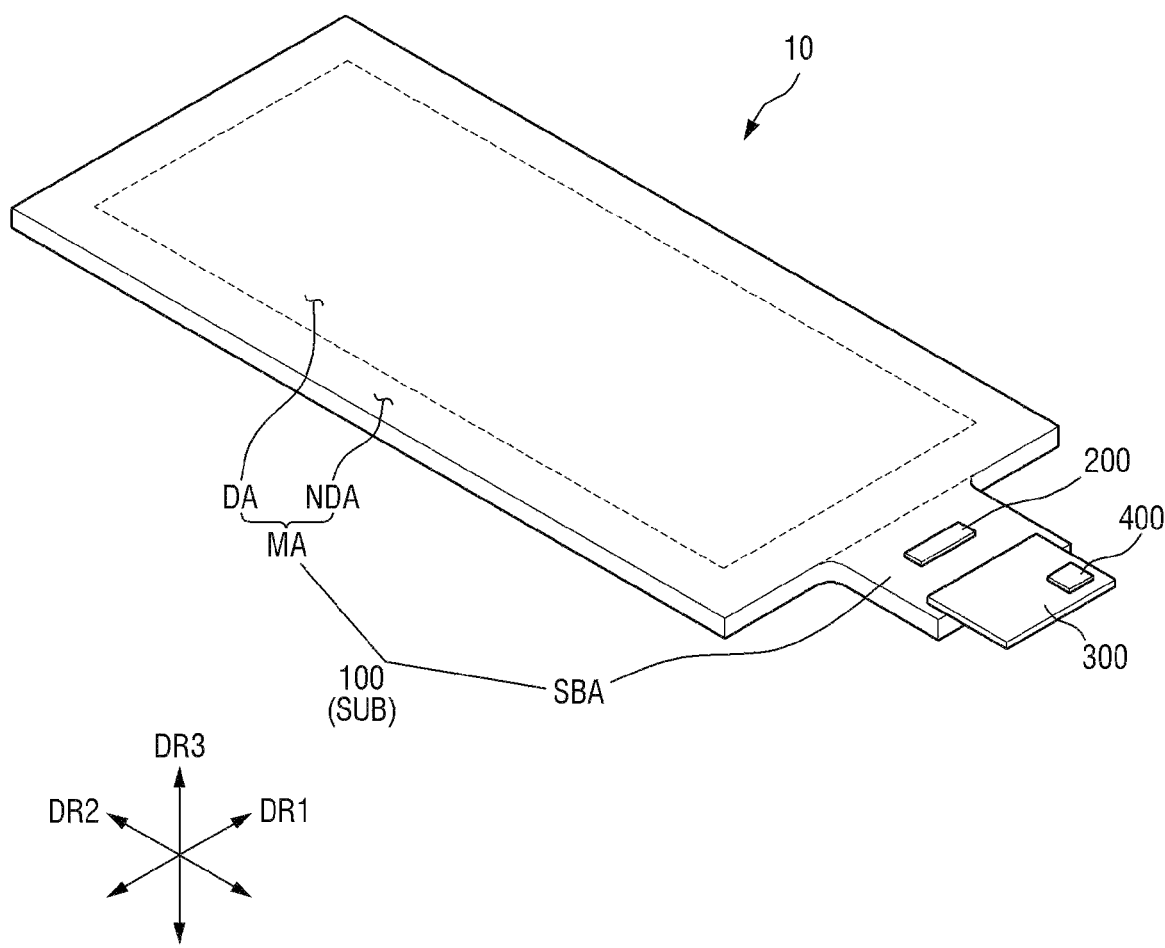
FIG. 1 is a perspective view of a display device according to an embodiment of the present disclosure.
Figure 2:
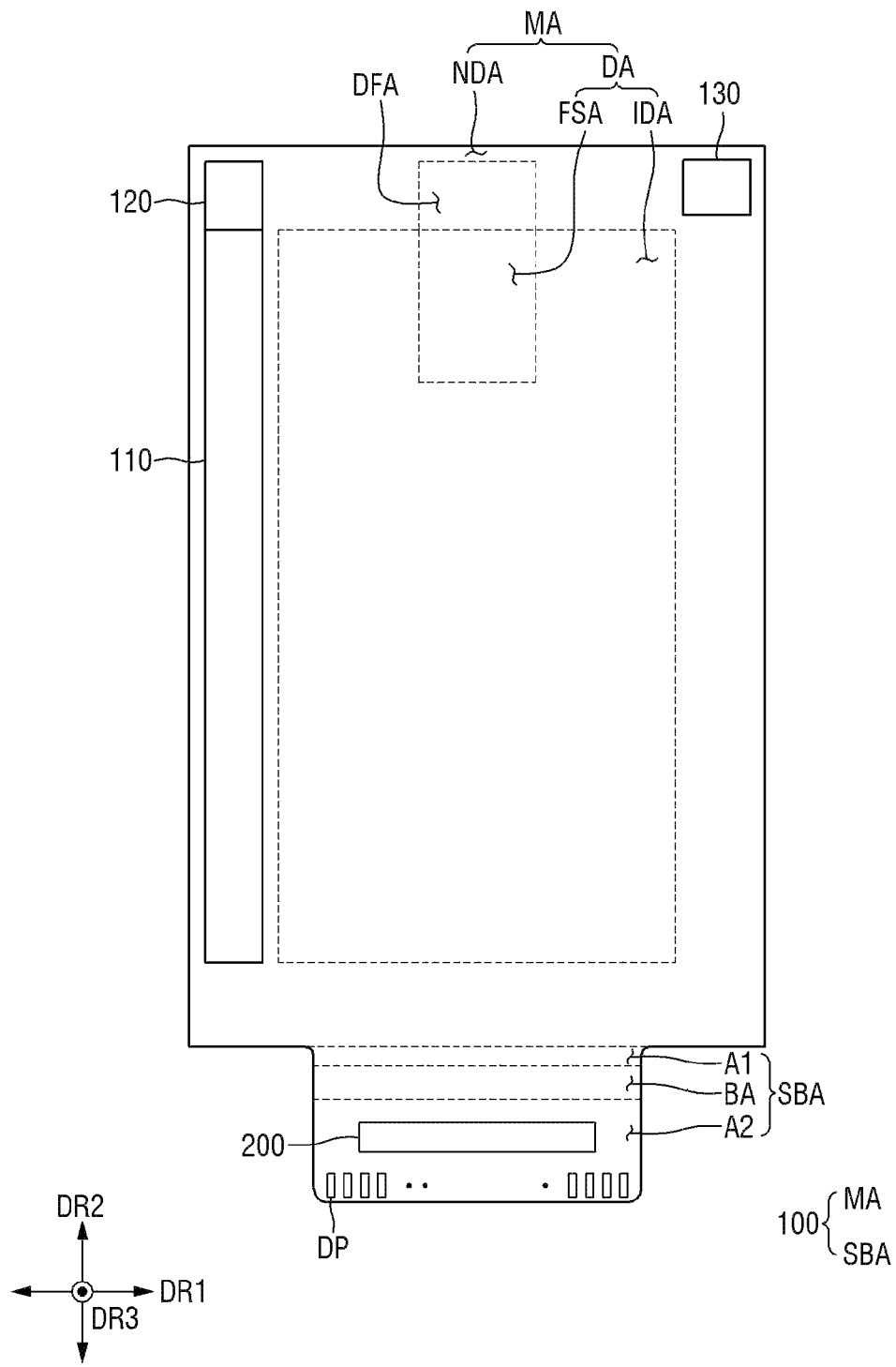
FIG. 2 is a plan view showing a display panel and a display driving circuit according to an embodiment of the present disclosure.
Figure 3:
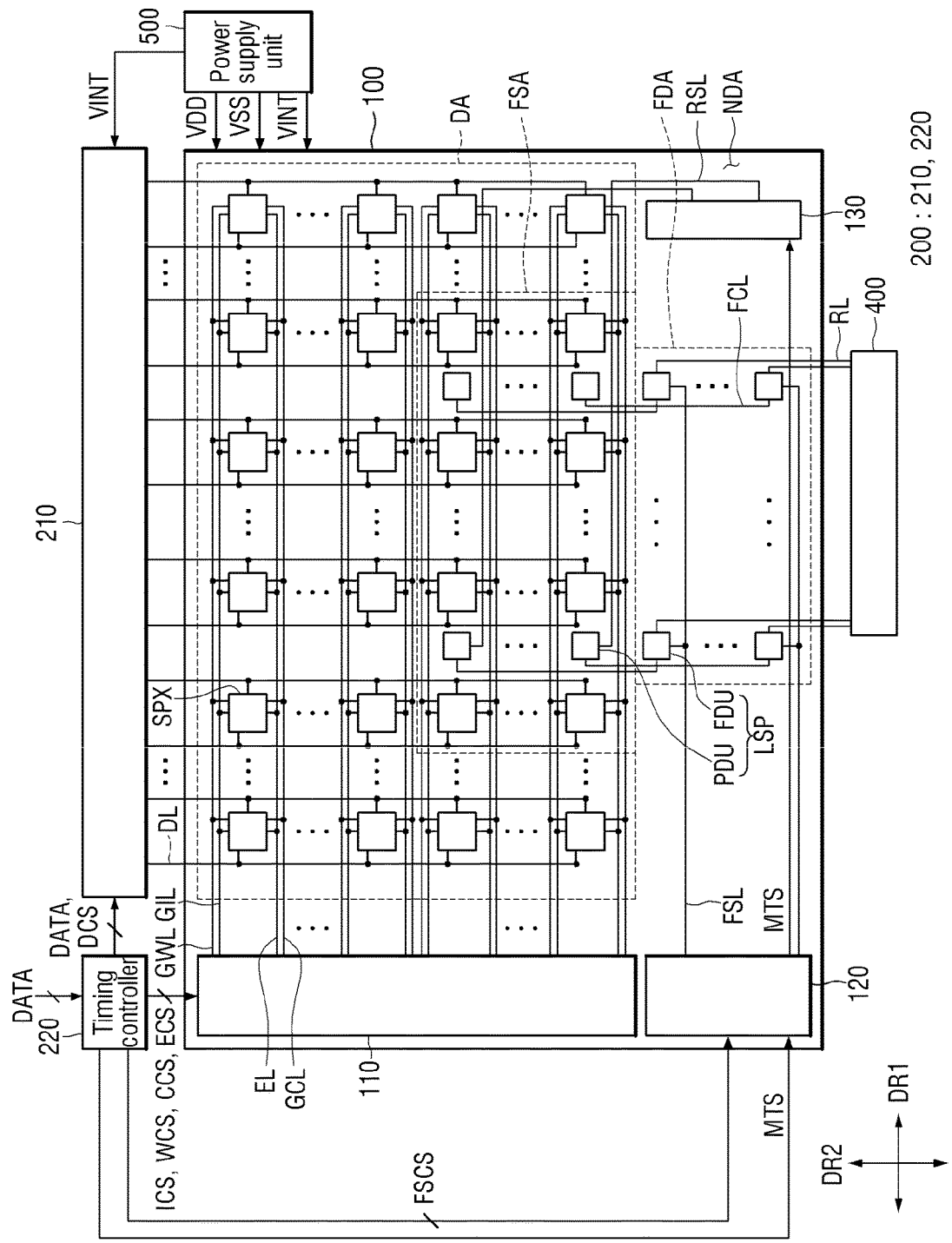
FIG. 3 is a block diagram showing in detail a display device according to an embodiment of the present disclosure.

FIG. 1 is a perspective view of a display device 10 according to an embodiment of the present disclosure. FIG. 2 is a plan view showing a display panel 100 and a display driving circuit 200 according to an embodiment of the present disclosure. FIG. 3 is a block diagram showing in detail a display device according to an embodiment of the present disclosure.

Referring to FIGS. 1 and 2, the display device 10 is for displaying moving images or still images. The display device 10 may be used as the display screen of portable electronic devices such as a mobile phone, a smart phone, a tablet PC, a smart watch, a watch phone, a mobile communications terminal, an electronic notebook, an electronic book, a portable multimedia player (PMP), a navigation device and a ultra mobile PC (UMPC), as well as the display screen of various products such as a television, a notebook, a monitor, a billboard and the Internet of Things (IoT).

The display device 10 may be a light-emitting display device such as an organic light-emitting display device using organic light-emitting diodes, an inorganic light-emitting display device including an inorganic semiconductor, and a micro light-emitting display device using micro or nano light-emitting diodes (micro LEDs or nano LEDs). In the following description, an organic light-emitting display device is described as an example of the display device 10. It is, however, to be understood that the present disclosure is not limited thereto.

The display device 10 includes the display panel 100, a display driving circuit 200 and a circuit board 300.

The display panel 100 may be formed in a rectangular plane having shorter sides in a first direction DR1 and longer sides in a second direction DR2 intersecting the first direction DR1. Each of the corners where the shorter side in the first direction DR1 meets the longer side in the second direction DR2 may be formed at a right angle or may be rounded with a predetermined curvature. The shape of the display panel 100 when viewed from the top is not limited to a quadrangular shape, but may be formed in a different polygonal shape, a circular shape, or an elliptical shape. The display panel 100 may be formed flat, but is not limited thereto. For example, the display panel 100 may be formed at left and right ends, and may include a curved portion having a constant curvature or a varying curvature. In addition, the display panel 100 may be flexible so that it can be curved, bent, folded or rolled.

A substrate SUB of the display panel 100 may include a main area MA and a subsidiary area SBA.

The main area MA may include a display area DA where images are displayed, and a non-display area NDA around the display area DA.

The display area DA includes display pixels SPX, e.g., see FIG. 3, for displaying images. The display area DA may occupy most of the main area MA. The display area DA may be disposed at the center of the main area MA.

The display area DA may include an image display area IDA and a fingerprint sensing area FSA. The image display area IDA may refer to the other area of the display area DA than the fingerprint sensing area FSA, where only images are displayed and a user's fingerprint is not sensed.

The fingerprint sensing area FSA may refer to the image display area IDA where a photo-detecting unit PDU, e.g., see FIG. 3, of each of the light-sensing pixels LSP, e.g., see FIG. 3, for sensing a user's fingerprint is included. Accordingly, images are displayed in the fingerprint sensing area FSA as well. The fingerprint sensing area FSA may be a part of the display area DA, but the embodiments of the present disclosure are not limited thereto. The display area DA may include only the fingerprint sensing area FSA without the image display area IDA. In such case, the fingerprint sensing area FSA may be substantially identical to the display area DA. In other words, the entire display area DA may be the fingerprint sensing area FSA.

Although the fingerprint sensing area FSA is disposed at the center of one edge of the display area DA, for example, at the center of the upper edge as shown in FIG. 2, the embodiments of the present disclosure are not limited thereto. The fingerprint sensing area FSA may be located apart from one edge of the display area DA. Alternatively, the fingerprint sensing area FSA may be located closer to one side at one edge of the display area DA. For example, the fingerprint sensing area FSA may be disposed on the left or right side of the upper edge of the display area DA. Alternatively, the fingerprint sensing area FSA may be disposed on the lower edge of the display area DA or on the left or right side of the lower edge.

The non-display area NDA may be disposed adjacent to the display area DA. The non-display area NDA may be disposed on the outer side of the display area DA. The non-display area NDA may surround the display area DA. The non-display area NDA may be defined as the border of the display panel 100.

In the non-display area NDA, a light-sensing reset driver 130 may be disposed, which selectively supplies reset signals to the photo-detecting units PDU of the light-sensing pixels LSP, e.g., see FIG. 3, to selectively control the light-sensing period of the photo-detecting units PDU. The light-sensing reset driver 130 selectively supplies reset signals to light-sensing pixels LSP, e.g., see FIG. 3, for at least each horizontal line in response to a line select signal from the display driving circuit 200. At this time, the light-sensing reset driver 130 may sequentially supply reset signals to the light-sensing pixels LSP, e.g., see FIG. 3, for at least each horizontal line in response to a line select signal input at least every frame period. Accordingly, each of the light-sensing pixels LSP, e.g., see FIG. 3, is reset when the reset signal is input for each horizontal line, and senses light during at least one frame period until the next reset signal is input.

A fingerprint sensing driving area DFA may be disposed in the non-display area NDA as shown in FIG. 2. The fingerprint sensing driving area DFA may include the sense driving unit FDU, e.g., see FIG. 3, of each of the light-sensing pixels LSP, e.g., see FIG. 3. The fingerprint sensing driving area DFA may be a part of the non-display area NDA.

The fingerprint sensing driving area DFA may be disposed adjacent to the fingerprint sensing area FSA. For example, the fingerprint sensing driving area DFA may be disposed on the upper side of the fingerprint sensing area FSA of the display area DA of FIG. 2. The sense driving units FDU, e.g., see FIG. 3, of the fingerprint sensing driving area DFA electrically connect the photo-detecting units PDU of the light-sensing pixels LSP, e.g., see FIG. 3, with the respective sensing lines in response to a fingerprint scan signal applied from a fingerprint scan driver 120.

Each of the sensing lines may be connected to a fingerprint driving circuit 400. The fingerprint driving circuit 400 may be implemented as an integrated circuit (IC) and may be attached on the circuit board 300.

The subsidiary area SBA may protrude from one side of the main area MA in the second direction DR2. The length of the subsidiary area SBA in the second direction DR2 may be smaller than the length of the main area MA in the second direction DR2. The length of the subsidiary area SBA in the first direction DR1 may be substantially less than the length of the main area MA in the first direction DR1 or may be substantially equal to it.

Although the subsidiary area SBA is unbent in the example shown in FIGS. 1 and 2, the subsidiary area SBA may be bent such that it is located under the main area MA. The subsidiary area SBA may overlap with the main area MA in a thickness direction DR3.

The subsidiary area SBA may include a first area A1, a second area A2 and a bending area BA.

The first area A1 protrudes from one side of the main area MA in the second direction DR2. One side of the first area A1 may be in contact with the non-display area NDA of the main area MA, and the opposite side of the first area A1 may be in contact with the bending area BA.

In the second area A2, pads DP and the display driving circuit 200 are disposed. The display driving circuit 200 may be attached to driving pads of the second area A2 using a conductive adhesive member such as an anisotropic conductive layer. The circuit board 300 may be attached to the pads DP of the second area A2 using a conductive adhesive member. One side of the second area A2 may be in contact with the bending area BA.

The bending area BA is a part of the display panel 100 that is bendable. When the bending area BA is bent, the second area A2 may be disposed under the first area A1 and under the main area MA. The bending area BA may be disposed between the first area A1 and the second area A2. One side of the bending area BA may be in contact with the first area A1, and the opposite side of the bending area BA may be in contact with the second area A2.

The display driving circuit 200 may generate signals and voltages for driving the display panel 100. The display driving circuit 200 may be implemented as an integrated circuit (IC) and may be attached to the display panel 100 by a chip on glass (COG) technique, a chip on plastic (COP) technique, or an ultrasonic bonding. It is, however, to be understood that the present disclosure is not limited thereto. For example, the display driving circuit 200 may be attached on the circuit board 300 by the chip-on-film (COF) technique.

The circuit board 300 may be attached to one end of the subsidiary area SBA. Accordingly, the circuit board 300 may be electrically connected to the display panel 100 and the display driving circuit 200. The display panel 100 and the display driving circuit 200 may receive digital video data, timing signals, and driving voltages through the circuit board 300. The circuit board 300 may be a flexible printed circuit board, a printed circuit board, or a flexible film such as a chip on film.

Referring to FIGS. 2 and 3, a display scan driver 110 may be disposed in the non-display area NDA. Although the display scan driver 110 is disposed on one side, e.g., the left side, of the display panel 100 in the drawings, the embodiments of the present disclosure are not limited thereto. For example, the display scan driver 110 may be disposed on both sides, e.g., left and right sides, of the display panel 100. The display scan driver 110 may be electrically connected to the display driving circuit 200 through scan fan-out lines. The display scan driver 110 may receive a write control signal from the display driving circuit 200, and may generate scan signals in response to the write control signal to output the scan signals to the scan lines.

The light-sensing reset driver 130 may be disposed at the corner where the right side and the upper side of the display area DA meet each other. The light-sensing reset driver 130 may be electrically connected to the display driving circuit 200 through sensing fan-out lines. The light-sensing reset driver 130 sequentially supplies reset signals to the sense driving units FDU, e.g., see FIG. 3, of the light-sensing pixels LSP, e.g., see FIG. 3, for each horizontal line in response to a line select signal from the display driving circuit 200. The light-sensing reset driver 130 may sequentially supply reset signals to the sense driving units FDU, e.g., see FIG. 3, for each horizontal line in response to the line select signal sequentially input at least every frame. A reset signal may be supplied to the sense driving units FDU, e.g., see FIG. 3, for each horizontal line at every several frames. The sense driving units FDU, e.g., see FIG. 3, reset the respective the photo-detecting units PDU to a reset voltage when a reset signal is input for each horizontal line, and drive the photo-detecting units PDU so that they sense light during a plurality of frame periods until the next reset signal is input.

The fingerprint scan driver 120 may be disposed in the non-display area NDA. The fingerprint scan driver 120 may be electrically connected to the display driving circuit 200 through fingerprint fan-out lines. The fingerprint scan driver 120 may receive a fingerprint scan control signal from the display driving circuit 200, and may generate fingerprint scan signals in response to a fingerprint scan control signal to output the fingerprint scan signals to the fingerprint scan lines. Accordingly, the sense driving units FDU, e.g., see FIG. 3, of the fingerprint sensing driving area DFA electrically connect the photo-detecting units PDU of the light-sensing pixels LSP, e.g., see FIG. 3, with the sensing lines, respectively, in response to the fingerprint scan control signal applied from the fingerprint scan driver 120.

Incidentally, the fingerprint scan driver 120 may be disposed at the corner where the left and upper sides of the display area DA meet each other, as shown in FIG. 2, and may be disposed on the upper side of the display scan driver 110. Alternatively, the fingerprint scan driver 120 may be disposed on the upper side of the display area DA and on the left side of the light-sensing reset driver 130. Alternatively, the fingerprint scan driver 120 may be disposed on the upper side of the display scan driver 110 and on the upper side of the display panel 100, and may be disposed on the left side of the light-sensing reset driver 130.

As shown in FIG. 3, the display device according to the embodiment includes the display panel 100, the display scan driver 110, the fingerprint scan driver 120, the light-sensing reset driver 130, the display driving circuit 200, and a power supply unit 500. The display driving circuit 200 may include a data driver 220 and a timing controller 210. In addition, the display driving circuit 200 may be implemented as one-chip (1-chip) in which the display scan driver 110, the fingerprint scan driver 120 and the light-sensing reset driver 130 are formed integrally.

The display panel 100 may include display pixels SPX disposed in the display area DA, light-sensing pixels LSP, display write lines GWL, display initialization lines GIL, display control lines GCL, emission lines EL, data lines DL, fingerprint scan lines FSL, sensing connection lines FCL and sensing lines RL, which are disposed in the display area DA.

The display scan driver 110, the fingerprint scan driver 120, and the light-sensing reset driver 130 are disposed in the non-display area NDA.

The display write lines GWL, the display initialization lines GIL, the display control lines GCL, the emission lines EL, and the fingerprint scan lines FSL may be extended in the first direction DR1. The data lines DL, the sensing connection lines FCL, and the sensing lines RL may be extended in the second direction DR2.

The display pixels SPX may be arranged in a matrix in the first direction DR1 and the second direction DR2 in the display area DA. Each of the display pixels SPX may be connected to one of the display write lines GWL, one of the display initialization lines GIL, one of the display control lines GCL, and one of the emission lines EL. Each of the display pixels SPX may receive the data voltage from the data line DL in response to the fingerprint scan signal of the display write line GWL, the display initialization signal of the display initialization line GIL and the display control signal of the display control line GCL, and may supply a driving current to the light-emitting element according to the data voltage so that light is emitted.

Each of the light-sensing pixels LSP may include a photo-detecting unit PDU and a sense driving unit FDU. The photo-detecting unit PDU of each of the light-sensing pixels LSP may be disposed in the fingerprint sensing area FSA, while the sense driving unit FDU may be disposed in the fingerprint sensing driving area DFA. That is to say, the photo-detecting unit PDU of each of the light-sensing pixels LSP for fingerprint sensing may be disposed in the fingerprint sensing driving area DFA that is a part of the display area DA, while the sense driving unit FDU may be disposed in the fingerprint sensing driving area DFA that is a part of the non-display area NDA.

The photo-detecting unit PDU may be arranged in a matrix in the first direction DR1 and the second direction DR2 in the fingerprint sensing area FSA. The photo-detecting units PDU for each horizontal line may be connected to the light-sensing reset driver 130. In addition, the photo-detecting units PDU may be connected to the sense driving units FDU through the sensing connection lines FCL, respectively. In other words, the photo-detecting units PDU may be connected to the sense driving units FDU through the sensing connection lines FCL.

The sense driving units FDU may be connected to the photo-detecting units PDU, respectively. In order to clearly distinguish between the sense driving units FDUs and the photo-detecting units PDU, the sense driving units FDU are disposed in the fingerprint sensing driving area DFA in the example shown in FIG. 3. It should be noted that the sense driving units FDUs may be disposed in the fingerprint sensing area FSA together with the photo-detecting units PDU of the fingerprint sensing area FSA.

Each of the sense driving units FDU may be arranged in a matrix in the first direction DR1 and the second direction DR2. Each of the sense driving units FDU may be connected to one of the fingerprint scan lines FSL, one of the sensing connection lines FCL, one of the fingerprint reset lines RSL, and one of the sensing lines RL.

The sense driving units FDU may simultaneously reset the photo-detecting units PDU for each horizontal line in response to reset signals input from the light-sensing reset driver 130 at least every frame period. In addition, each of the sense driving units FDU may connect the sensing connection line FCL connected to the photo-detecting unit PDU with the sensing line RL in response to a fingerprint scan signal of the fingerprint scan line FSL.

The fingerprint driving circuit 400 may be connected to the sensing lines RL. The fingerprint driving circuit 400 may sense a fingerprint based on sensing voltages of the sensing lines RL. For example, lights output from the display panel 100 may be reflected off ridges and valleys of a fingerprint of a user's finger placed on the fingerprint sensing area FSA. The amount of lights reflected off the ridges crest of the fingerprint of the finger may be different from the amount of lights reflected off the valleys. Therefore, the voltage (sensing voltage) at the anode electrode of the photo-detecting element of the photo-detecting unit PDU may vary depending on whether the light is reflected off the ridges of the finger or the light reflected off the valleys of the fingerprint. Accordingly, the sensing voltage sensed by the photo-detecting unit PDU may vary depending on whether the light is reflected off the ridges of the fingerprint of the finger F or the light is reflected off the valleys of the fingerprint of the finger F. The fingerprint driving circuit 400 may recognize a fingerprint of a finger based on the sensing voltages of the sensing lines RL.

The display scan driver 110 may be connected to the display write lines GWL, the display initialization lines GIL, the display control lines GCL, and the emission lines EL. The display scan driver 110 may include a display signal output for outputting fingerprint scan signals applied to the display write lines GWL, display initialization signals applied to the display initialization lines GIL and display control signals applied to the display control lines GCL; and an emission signal output for outputting emission signals applied to the emission lines EL.

The display scan driver 110 may receive a write control signal WCS, an initialization control signal ICS, a write control signal CCS and an emission control signal ECS from the timing controller 220. The display signal output of the display scan driver 110 may generate fingerprint scan signals according to the write control signal SCS and may output them to the display write lines GWL. In addition, the display signal output of the display scan driver 110 may generate display initialization signals according to the initialization control signal ICS and may output them to the display initialization lines GIL. In addition, the display signal output of the display scan driver 110 may generate display control signals according to the write control signal CCS and may output them to the display control lines GCL. Moreover, the emission signal output of the display scan driver 110 may generate display emission signals according to the emission control signal ECS and may output them to the display emission lines EL.

The light-sensing reset driver 130 receives a line select signal MTS from the timing controller 220 through the sensing fan-out lines. The light-sensing reset driver 130 sequentially supplies reset signals to the sense driving units FDU of the light-sensing pixels LSP for each horizontal line in response to the line select signal MTS. The light-sensing reset driver 130 sequentially supplies reset signals to the sense driving units FDU for each horizontal line in response to the line select signal MTS sequentially input at least every frame. Accordingly, the sense driving units FDU reset the photo-detecting units PDU for each horizontal line, and drive the photo-detecting units PDU so that they sense light during a plurality of frame periods until the next reset signal is input.

The fingerprint scan driver 120 may be connected to the fingerprint scan lines FSL. The fingerprint scan driver 120 may receive a fingerprint scan control signal FSCS from the timing controller 220. The fingerprint scan driver 120 may generate fingerprint scan signals in response to the fingerprint scan control signal FSCS to output them to the fingerprint scan lines FSL.

The data driver 210 converts digital video data DATA into data voltages and outputs them to the data lines DL. The data driver 210 may output data voltages in synchronization with the fingerprint scan signals. Therefore, the display pixels SPX are selected by the fingerprint scan signals of the display scan driver 110, and a data voltage may be applied to each of the selected display pixels SPX.

The timing controller 220 receives the digital video data DATA and timing signals from an external graphic device. For example, the external graphic device may be, but is not limited to, a graphic card of a computer, a set-top box, etc.

The timing controller 220 may generate the write control signal WCS, the initialization control signal ICS, the write control signal CCS and the emission control signal ECS for controlling the operation timing of the display scan driver 110 in response to the timing signals. In addition, the timing controller 220 may generate the line select signal MTS for controlling the output of the reset signal by the light-sensing reset driver 130 in response to timing signals. In addition, the timing controller 220 may generate the fingerprint scan control signal FSCS for controlling the operation timing of the fingerprint scan driver 210 in response to the timing signals. In addition, the timing controller 220 may generate a data control signal DCS for controlling the operation timing of the data driver 210 in response to the timing signals.

The timing controller 220 outputs the write control signal WCS, the initialization control signal ICS, the write control signal CCS and the emission control signal ECS to the display scan driver 110. The timing controller 220 outputs the fingerprint scan control signal FSCS to the fingerprint scan driver 120. The timing controller 220 outputs the digital video data DATA and the data control signal DCS to the data driver 220.

The power supply unit 500 may generate a plurality of driving voltages and output them to the display panel 100. The power supply unit 500 may output a first supply voltage VDD, a second supply voltage VSS, and a third supply voltage VINT to the display panel 100. The first supply voltage VDD may be a high-level driving voltage, the second driving voltage VSS may be a low-level driving voltage, and the third driving voltage VINT may be a voltage to initialize the gate electrode of the driving transistor of each of the display pixels.

Figure 4:
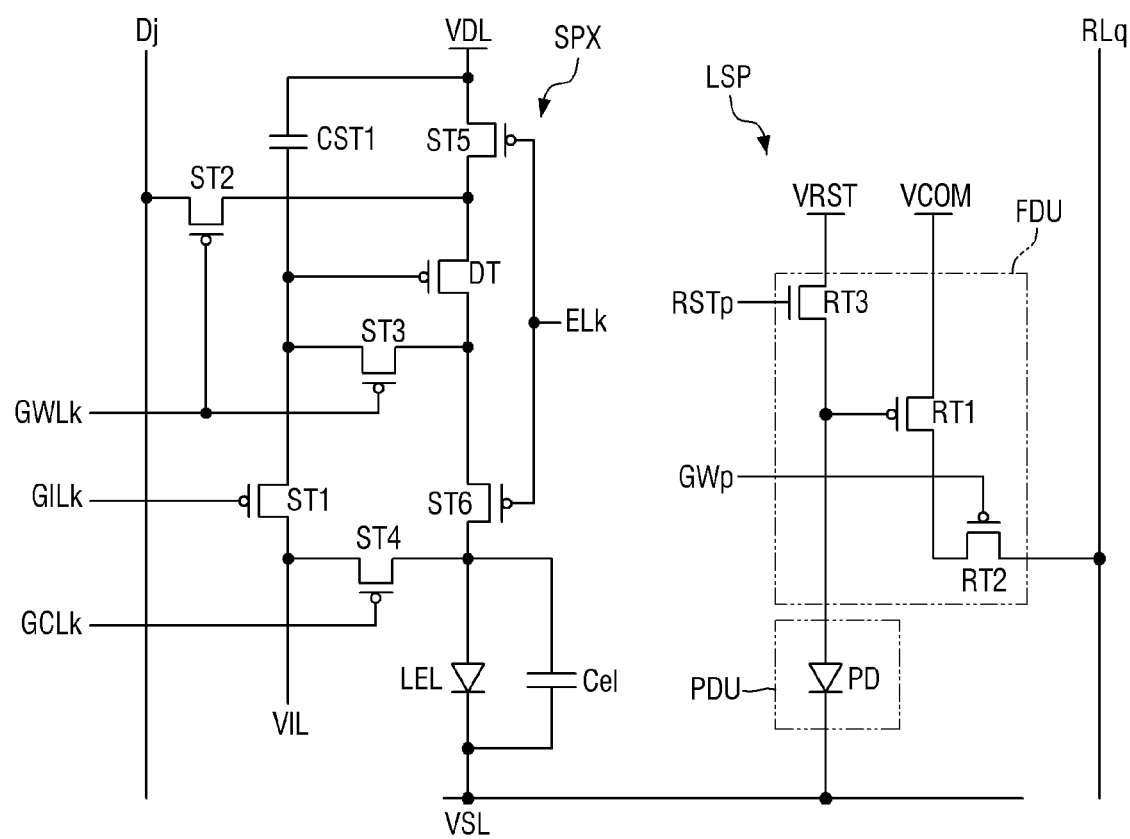
FIG. 4 is a circuit diagram showing a display pixel and a light-sensing pixel according to an embodiment of the present disclosure.

FIG. 4 is a circuit diagram showing a display pixel SPX and a light-sensing pixel according to an embodiment of the present disclosure.

Referring to FIG. 4, the display pixel SPX according to an embodiment may be connected to the $k^{th}$ display initialization line GILk, the $k^{th}$ display write line GWLk, and the $k^{th}$ display control line GCLk. In addition, the display pixel SPX may be connected to a first supply voltage line VDL from which a first supply voltage is supplied, a second supply voltage line VSL from which a second supply voltage is supplied, and a third supply voltage line VIL from which a third supply voltage is supplied, where k, j, i and p are a positive integer, or a natural number except zero.

The display pixel SPX may include a light-emitting unit and a pixel driving unit. The light-emitting unit may include a light-emitting element LEL. The pixel driving unit may include a driving transistor DT, switch elements, and a capacitor CST1. The switch elements include first to sixth transistors ST1, ST2, ST3, ST4, ST5 and ST6.

The driving transistor DT may include a gate electrode, a first electrode and a second electrode. A drain-source current Ids, hereinafter referred to as "driving current", of driving transistor DT flowing between the first electrode and the second electrode is controlled according to the data voltage applied to the gate electrode. The driving current Ids flowing through the channel of the driving transistor DT is proportional to the square of the difference between a voltage Vgs between the first electrode and the gate electrode of the driving transistor DT and the threshold voltage, as shown in Equation 1 below:

$$Ids = k' \times (Vsg - Vth)^2 \qquad \text{[Equation 1]}$$

where k' denotes a proportional coefficient determined by the structure and physical properties of the driving transistor, Vsg denotes the voltage between the first electrode and the gate electrode of the driving transistor, and Vth denotes the threshold voltage of the driving transistor.

The light-emitting element LEL emits light as the driving current Ids flows therein. The amount of the light emitted from the light-emitting elements LEL may increase with the driving current Ids.

The light-emitting element LEL may be an organic light-emitting diode including an organic emissive layer disposed between an anode electrode and a cathode electrode. Alternatively, the light-emitting element LEL may be an inorganic light-emitting element including an inorganic semiconductor disposed between an anode electrode and a cathode electrode. Alternatively, the light-emitting element LEL may be quantum-dot light-emitting element including a quantum-dot emissive layer disposed between an anode electrode and a cathode electrode. Alternatively, the light-emitting element LEL may be a micro light-emitting element including a micro light-emitting diode disposed between an anode electrode and a cathode electrode.

The anode electrode of the light-emitting element LEL may be connected to the first electrode of the fourth transistor ST4 and the second electrode of the sixth transistor ST6, while the cathode electrode thereof may be connected to the second supply voltage line VSL. A parasitic capacitance Cel may be formed between the anode electrode and the cathode electrode of the light-emitting element LEL.

The first transistor ST1 is turned on by an initialization scan initialization signal of the $k^{th}$ display initialization line GILk to connect the gate electrode of the driving transistor DT with the third supply voltage line VIL. Accordingly, a third supply voltage of the third supply voltage line VIL may be applied to the gate electrode of the driving transistor DT. The gate electrode of the first transistor ST1 may be connected to the $k^{th}$ display initialization line GILk, the first electrode thereof may be connected to the gate electrode of the driving transistor DT, and the second electrode thereof may be connected to the third supply voltage line VIL.

The second transistor ST2 is turned on by the fingerprint scan signal of the $k^{th}$ display write line GWLk to connect the first electrode of the driving transistor DT with the $j^{th}$ data line Dj. Accordingly, the data voltage of the $j^{th}$ data line Dj may be applied to the first electrode of the driving transistor DT. A gate electrode of the second transistor ST2 may be connected to the $k^{th}$ display write line GWLk, a first electrode thereof may be connected to the first electrode of the driving transistor DT, and a second electrode thereof may be connected to the $j^{th}$ data line Dj.

The third transistor ST3 is turned on by the fingerprint scan signal of the $k^{th}$ display write line GWLk to connect the gate electrode with the second electrode of the driving transistor DT. When the gate electrode and the second electrode of the driving transistor DT are connected with each other, the driving transistor DT works as a diode. A gate electrode of the third transistor ST3 may be connected to the $k^{th}$ display write line GWLk, a first electrode thereof may be connected to the second electrode of the driving transistor DT, and a second electrode thereof may be connected to the gate electrode of the driving transistor DT.

The fourth transistor ST4 is turned on by a display control signal of the $k^{th}$ display control line GCLk to connect the anode electrode of the light-emitting element LEL with the third supply voltage line VIL. The third supply voltage of the third supply voltage line VIL may be applied to the anode electrode of the light-emitting element LEL. The gate electrode of the fourth transistor ST4 may be connected to the $k^{th}$ display control line GCLk, the first electrode thereof may be connected to the anode electrode of the light-emitting element LEL, and the second electrode thereof may be connected to the third supply voltage line VIL.

The fifth transistor ST5 is turned on by the emission signal of a $k^{th}$ emission line ELk to connect the first electrode of the driving transistor DT with the first supply voltage line VDL. The gate electrode of the fifth transistor ST5 is connected to the $k^{th}$ emission line Ek, the first electrode thereof is connected to the first supply voltage line VDL, and the second electrode thereof is connected to the first electrode of the driving transistor DT.

The sixth transistor ST6 is disposed between the second electrode of the driving transistor DT and the anode electrode of the light-emitting element LEL. The sixth transistor ST6 is turned on by the emission control signal of the $k^{th}$ emission line ELk to connect the second electrode of the driving transistor DT with the anode electrode of the light-emitting element LEL. The gate electrode of the sixth transistor ST6 is connected to the $k^{th}$ emission line ELk, the first electrode thereof is connected to the second electrode of the driving transistor DT, and the second electrode thereof is connected to the anode electrode of the light-emitting element LEL.

When both the fifth transistor ST5 and the sixth transistor ST6 are turned on, the driving current Ids of the driving transistor DT according to the data voltage applied the gate electrode of the driving transistor DT may flow to the light-emitting element LEL.

The capacitor CST1 is formed between the gate electrode of the driving transistor DT and the first supply voltage line VDL. The first capacitor electrode of the capacitor CST1 may be connected to the gate electrode of the driving transistor DT, and the second capacitor electrode thereof may be connected to the first driving voltage line VDL.

When the first electrode of each of the first to sixth transistors ST1, ST2, ST3, ST4, ST5 and ST6 and the driving transistor DT is a source electrode, the second electrode thereof may be a drain electrode. Alternatively, when the first electrode of each of the first to sixth transistors ST1, ST2, ST3, ST4, ST5 and ST6 and the driving transistor DT is a drain electrode, the second electrode thereof may be a source electrode.

The active layer of each of the first to sixth transistors ST1, ST2, ST3, ST4, ST5 and ST6 and the driving transistor DT may be formed of one of poly silicon, amorphous silicon and oxide semiconductor. Although the first to sixth transistors ST1, ST2, ST3, ST4, ST5 and ST6 and the driving transistor DT are implemented as p-type metal oxide semiconductor field effect transistors (MOSFETs) in FIG. 6, this is merely illustrative. They may be implemented as n-type MOSFETs. For example, the first to sixth transistors ST1, ST2, ST3, ST4, ST5 and ST6, and the driving transistor DT may be implemented as n-type MOSFETs. Alternatively, at least one of the first to sixth transistors ST1, ST2, ST3, ST4, ST5 and ST6 may be implemented as an n-type MOSFET.

According to the embodiment of the present disclosure, each of the light-sensing pixels LSP is divided into a photo-detecting unit PDU including a photo-detecting element PD, and a sense driving unit FDU including first to third sensing transistors RT1 to RT3 and a sensing capacitor (not shown). The sensing capacitor may be formed in parallel with the photo-detecting element PD.

The photo-detecting element PD of the photo-detecting unit PDU may include a first electrode, a PIN semiconductor layer, and a second electrode. The first electrode of the photo-detecting element PD may be an anode electrode, and the second electrode may be a cathode electrode. The first electrode of the photo-detecting element PD may be connected to the second supply voltage line VSL from which a second supply voltage is applied. The second electrode of the photo-detecting element PD may be connected to the gate electrode of the first sensing transistor RT1. The p-i-n semiconductor layer of the photo-detecting element PD may include a p-type semiconductor layer connected to the anode electrode, an n-type semiconductor layer connected to the cathode electrode, and an i-type semiconductor layer disposed between the p-type semiconductor layer and the n-type semiconductor layer.

The voltage at the photo-detecting element PD may vary depending on the amount of light incident on the photo-detecting element PD. For example, as the amount of light incident on the photo-detecting element PD increases, the voltage at one electrode of the photo-detecting element PD may increase.

The first sensing transistor RT1 of the sense driving unit FDU may allow a light-sensing current to flow according to the voltages of the photo-detecting element PD and the sensing capacitor. The amount of current of the light-sensing current may vary depending on a voltage applied to the photo-detecting element PD and the sensing capacitor. The gate electrode of the first sensing transistor RT1 may be connected to the second electrode of the photo-detecting element PD. A first electrode of the first sensing transistor RT1 may be connected to a common voltage source VCOM from which a common voltage is applied. A second electrode of the first sensing transistor RT1 may be connected to a first electrode of the second sensing transistor RT2.

When the fingerprint scan signal GWp of the gate-on voltage is applied to the fingerprint scan line, the second sensing transistor RT2 allows the sensing current of the first sensing transistor RT1 to flow to the fingerprint sensing line RLq. In this instance, the fingerprint sensing line RLq may be charged with the sensing voltage by the sensing current. The gate electrode of the second sensing transistor RT2 may be connected to the fingerprint scan line, the first electrode thereof may be connected to the second electrode of the first sensing transistor RT1, and the second electrode thereof may be connected to the fingerprint sensing line RLq.

When a fingerprint reset signal RSTp of the gate-on voltage is applied to the fingerprint reset line, the third sensing transistor RT3 may reset the voltages of the photo-detecting element PD and the sensing capacitor to the reset voltage of a reset voltage source VRST. The gate electrode of the third sensing transistor RT3 may be connected to the fingerprint reset line, the first electrode thereof may be connected to the reset voltage source VRST, and the second electrode thereof may be connected to the second electrode of the photo-detecting element PD.

Although the first sensing transistor RT1 and the second sensing transistor RT2 are implemented as p-type metal oxide semiconductor field effect transistors (MOSFETs) while the third sensing transistor RT3 is implemented as an n-type MOSFET in the example shown in FIG. 4, this is merely illustrative. Optionally, they may be of the same type or different types. In addition, one of the first and second electrodes of each of the first sensing transistor RT1, the second sensing transistor RT2 and the third sensing transistor RT3 may be a source electrode, while the other one may be a drain electrode.

Figure 5:
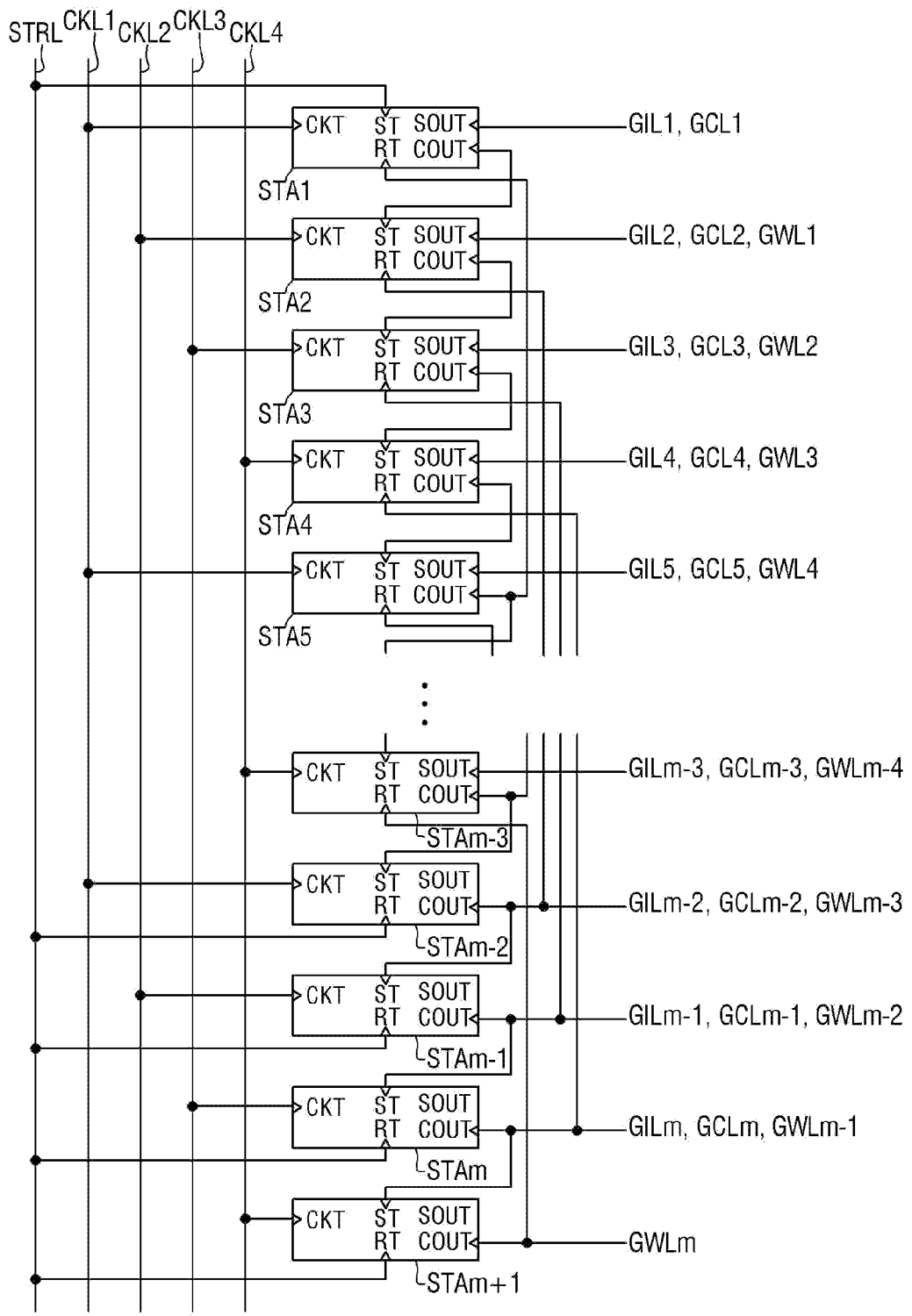
FIG. 5 is a view showing an example of the display scan driver according to an embodiment.

FIG. 5 is a view showing an example of the display scan driver according to an embodiment.

Referring to FIG. 5, the display scan driver 110 may include a plurality of display stages STA1, STA2, . . . , STAm and STA(m+1), where m is a positive integer. Each of the plurality of display stages STA1, STA2, . . . , STAm and STA(m+1) may include a start signal input ST, a reset signal input RT, a clock signal input CKT, a display signal output SOUT and a carry signal output COUT.

The start signal input ST of each of the plurality of display stages STA1, STA2, . . . , STAm and STA(m+1) may be connected to a start line STRL or the carry signal output COUT of the previous display stage. For example, the start signal input ST of the first display stage STA1 may be connected to the display start line STRL from which the display start signal is input. In addition, the start signal input ST of each of the plurality of display stages STA2, STA3, . . . , STAm and STA(m+1) except for the first display stage STA1 may be connected to the carry signal output COUT of the previous display stage. For example, the start signal input ST of the second display stage STA2 may be connected to the carry signal output COUT of the first display stage STA1, and the start signal input ST of the third display stage STA3 may be connected to the carry signal output COUT of the second display stage STA2.

The reset signal input RT of each of the plurality of display stages STA1, STA2, . . . , STAm−3 may be connected to the carry signal output COUT of the subsequent display stage or may be connected to the start line STRL. For example, the reset signal input RT of the first display stage STA1 may be connected to the carry signal output COUT of the fifth display stage STA5. The reset signal input RT of each of the last four display stages STAm−2, . . . STAm+1 may be connected to the start line STRL.

The clock signal input CKT of each of the plurality of display stages STA1, STA2, . . . , STAm and STA(m+1) may be connected to one of the clock lines CKL1, CKL2, CKL3 and CKL4.

The display stages STA1, STA2, . . . , STAm and STA(m+1) may be connected to the clock lines CKL1, CKL2, CKL3 and CKL4 sequentially. For example, the clock signal input CKT of the first display stage STA1 may be connected to the first clock line CKL1, and the clock signal input CKT of the second display stage STA2 may be connected to the second clock line CKL2. The clock signal input CKT of the third display stage STA3 may be connected to the third clock line CKL3, and the clock signal input CKT of the fourth display stage STA4 may be connected to the fourth clock line CKL4.

The scan signal output SOUT of each of the plurality of display stages STA1, STA2, . . . , STAm and STA(m+1) may be connected to the respective display write line, the respective display initialization line, and the respective display control line. For example, the first display stage STA1 may be connected to the first display initialization line GIL1 and the first display control line GCL1. In addition, the second display stage STA2 may be connected to a second display initialization line GIL2, a second display control line GCL2, and a first display write line GWL1. In addition, the third display stage STA3 may be connected to a third display initialization line GIL3, a third display control line GCL3, and a second display write line GWL2. In addition, the fourth display stage STA4 may be connected to a fourth display initialization line GIL4, a fourth display control line GCL4, and a third display write line GWL3. In addition, the $(m-1)^{th}$ display stage STA(m-1) may be connected to a $(m-1)^{th}$ display initialization line GIL(m-1), a $(m-1)^{th}$ display control line GCL(m-1) and a $(m-2)^{th}$ display write line GWL(m-2). In addition, the mth display stage STAm may be connected to a mth display initialization line GILm, a mth display control line GCLm and a $(m-1)^{th}$ display write line GWL(m-1). Moreover, the $(m+1)^{th}$ display stage STA(m+1) may be connected to a mth display write line GWLm.

The carry signal output COUT of each of the plurality of display stages STA1, STA2, . . . , STAm and STA(m+1) may be connected to the reset signal input RT of the previous display stage and the start signal input ST of the subsequent display stage. It should be noted that the carry signal output COUT of each of the first display stage STA1, the second display stage STA2, the third display stage STA3 and the fourth display stage STA4 may be connected only to the start signal input ST of the subsequent display stage.

Figure 6:
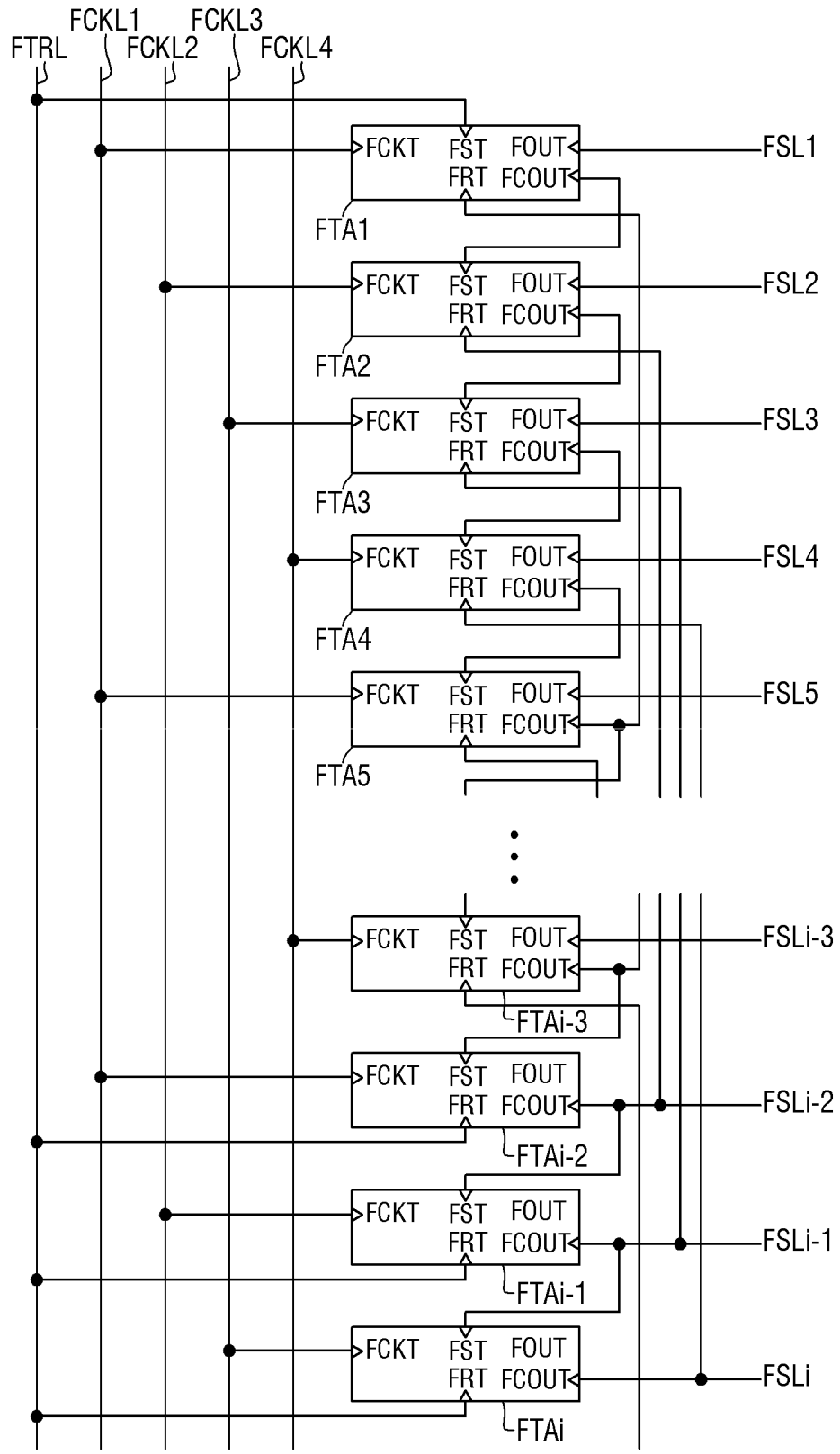
FIG. 6 is a view showing an example of the fingerprint scan driver according to an embodiment.

FIG. 6 is a view showing an example of the fingerprint scan driver according to an embodiment.

Referring to FIG. 6, the fingerprint scan driver 120 may include a plurality of fingerprint stages FTA1, FTA2, . . . , and FTAi, where i is an integer smaller than m. Each of the plurality of fingerprint stages FTA1, FTA2, . . . , and FTAi may include a fingerprint start signal input FST, a fingerprint reset signal input FRT, a fingerprint clock signal input FCKT, a fingerprint scan signal output FOUT and a fingerprint carry signal output FCOUT.

The fingerprint start signal input FST of each of the plurality of fingerprint stages FTA1, FTA2, . . . , and FTAi may be connected to a fingerprint start line FTRL or the fingerprint carry signal output FCOUT of the previous fingerprint stage. For example, the start signal input FST of the first fingerprint stage FTA1 may be connected to the fingerprint start line FTRL from which the fingerprint start signal is input. In addition, the fingerprint start signal input FST of each of the plurality of fingerprint stages FTA2, FTA3, FTA4, . . . , FTA(i-1) and FTAi except the first fingerprint stage FTA1 may be connected to the fingerprint carry signal output FCOUT of the previous fingerprint stage. For example, the fingerprint start signal input FST of the second fingerprint stage FTA2 may be connected to the fingerprint carry signal output FCOUT of the first fingerprint stage FTA1, and the fingerprint start signal input FST of the third fingerprint stage FTA3 may be connected to the fingerprint carry signal output FOUT of the second fingerprint stage FTA2.

The fingerprint reset signal input FRT of each of the plurality of sensing stages FTA1, FTA2, . . . , and FTAi may be connected to the fingerprint carry signal output FCOUT of the subsequent fingerprint stage or the fingerprint start line FTRL. For example, the fingerprint reset signal input FRT of the first fingerprint stage FTA1 may be connected to the fingerprint carry signal output FCOUT of the fifth fingerprint stage FTA5.

The fingerprint clock signal input FCKT of each of the plurality of sensing stages FTA1, FTA2, . . . , and FTAi may be connected to one of the fingerprint clock lines FCKL1, FCKL2, FCKL3 and FCKL4.

The plurality of fingerprint stages FTA1, FTA2, . . . , FTAi may be sequentially connected to the fingerprint clock lines FCKL1, FCKL2, FCKL3 and FCKL4. For example, the fingerprint clock signal input FCKT of the first fingerprint stage FTA1 may be connected to the first fingerprint clock line FCKL1, and the fingerprint clock signal input FCKT of the second fingerprint stage FTA2 may be connected to the second fingerprint clock line FCKL2. The fingerprint clock signal input FCKT of the third fingerprint stage FTA3 may be connected to the third fingerprint clock line FCKL3, and the fingerprint clock signal input FCKT of the fourth fingerprint stage FTA4 may be connected to the fourth fingerprint clock line FCKL4.

The plurality of fingerprint stages FTA1, FTA2, . . . , FTAi may be connected to the fingerprint scan lines FSL1, FSL2, FSL3, FSL4, . . . , FSL(i-1) and FSLi. The fingerprint scan signal output FOUT of each of the plurality of fingerprint stages FTA1, FTA2, . . . , FTAi may be connected to the respective fingerprint scan line FSL. For example, the first fingerprint stage FTA1 may be connected to the first fingerprint scan line FSL1, and the second fingerprint stage FTA2 may be connected to the second fingerprint scan line FSL2. In addition, the third fingerprint stage FTA3 may be connected to the third fingerprint scan line FSL3, and the fourth fingerprint stage FTA4 may be connected to the fourth fingerprint scan line FSL4. In addition, the $(i-1)^{th}$ fingerprint stage FTA(i-1) may be connected to the $(i-1)^{th}$ fingerprint scan line FSL(i-1), and the ith fingerprint stage FTAi may be connected to the ith fingerprint scan line FSLi.

The fingerprint carry signal output FCOUT of each of the plurality fingerprint stages FTA1, FTA2, . . . , FTAi may be connected to the fingerprint reset signal input FRT of the previous fingerprint stage and the fingerprint start signal input FST of the subsequent fingerprint stage. It should be noted that the carry signal output COUT of each of the first fingerprint stage FTA1, the second fingerprint stage FTA2, the third fingerprint stage FTA3 and the fourth fingerprint stage FTA4 may be connected only to the fingerprint start signal input FST of the subsequent sensing stage.

Incidentally, the plurality of display stages STA1, STA2, . . . , STAm and STA(m+1) may provide the fingerprint scan signals, the display initialization signals and the display control signals to the display pixels SPX of the display area DA. The plurality of fingerprint stages FTA1, FTA2, . . . , FTAi provides fingerprint scan signals to the sense driving units FDU connected to the photo-detecting units PDU of the fingerprint sensing area FSA that is a part of the display area DA. Since the fingerprint sensing area FSA is smaller than the display area DA, the number of fingerprint scan lines may be less than the number of fingerprint scan signals, the number of display initialization signals, and the number of display control signals. Therefore, the number of the plurality of fingerprint stages FTA1, FTA2, . . . , FTAi may be less than the number of the plurality of display stages STA1, STA2, . . . , STAm, STA(m+1).

Figure 7:
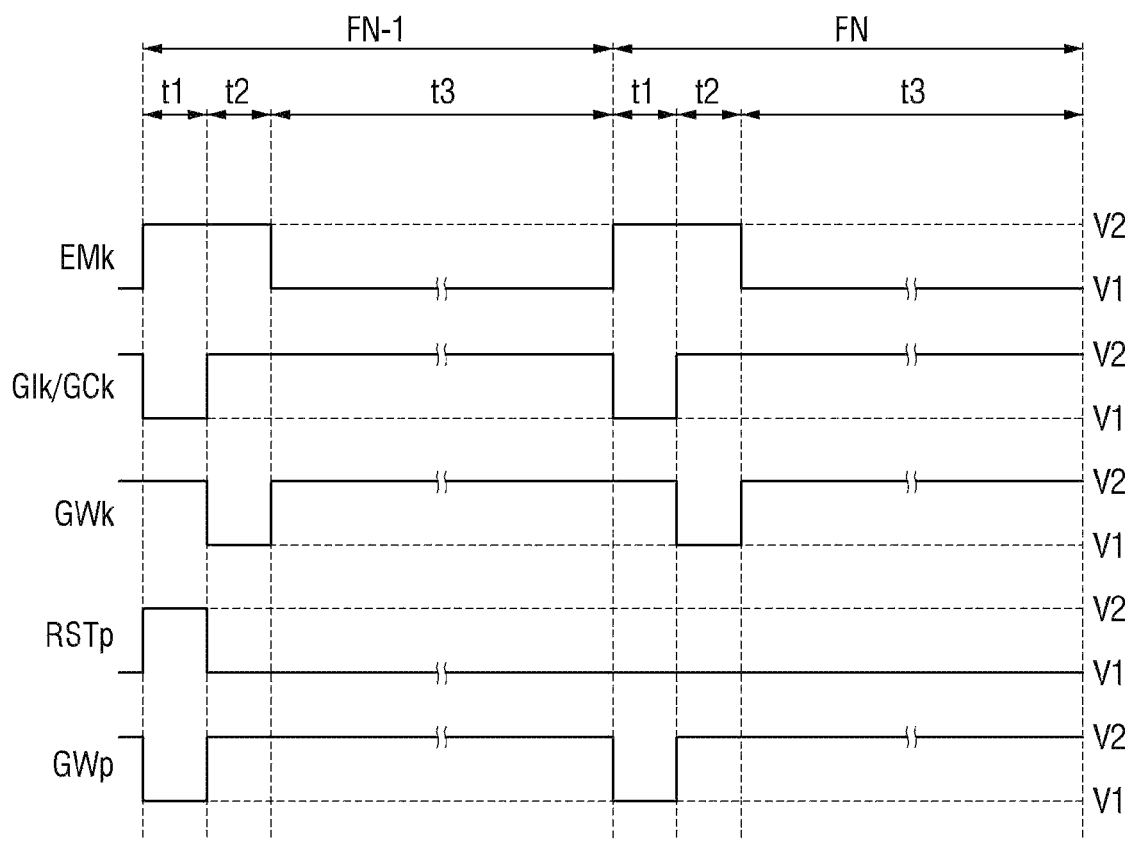
FIG. 7 is a waveform diagram showing scan signals input to a display pixel and a light-sensing pixel according to an embodiment.

FIG. 7 is a waveform diagram showing scan signals input to a display pixel and a light-sensing pixel according to an embodiment.

In FIG. 7, the $k^{th}$ display emission signal EMk applied to the $k^{th}$ display emission line ELk, the $k^{th}$ display initialization signal GIk applied to the $k^{th}$ display initialization line GILk, the $k^{th}$ display control signal GCk applied to the $k^{th}$ display control line GCLk, the $k^{th}$ fingerprint scan signal GWk applied to the $k^{th}$ display write line GWLk, the $p^{th}$ reset signal RSTp applied to the $p^{th}$ fingerprint reset line RSL, and the $p^{th}$ fingerprint scan signal GWp applied to the $p^{th}$ fingerprint scan line FSLp during the (n−1)$^{th}$ frame period FN−1 and the n$^{th}$ frame period FN are shown.

The k$^{th}$ display initialization signal GIk is a signal for controlling on/off of the first transistor ST1 of the display pixel SPX. The k$^{th}$ display control signal GCk is a signal for controlling on/off of the third transistor ST3 of the display pixel SPX. The k$^{th}$ fingerprint scan signal GWk is a signal for controlling on/off of the second transistor ST2 and the fourth transistor ST4. The k$^{th}$ display emission signal EMk is a signal for controlling on/off of the fifth transistor ST5 and the sixth transistor ST6.

The p$^{th}$ reset signal RSTp applied to the p$^{th}$ fingerprint reset line RSL is a signal for controlling the on/off of the third sensing transistor RT3. The p$^{th}$ fingerprint scan signal GWp applied to the p$^{th}$ fingerprint scan line FSLp is a signal for controlling the on/off of the second sensing transistor RT2.

Each of the (n−1)$^{th}$ frame period FN−1 and the n$^{th}$ frame period FN may include a first period t1, a second period t2, and a third period t3. In the first period t1, the gate electrode of the driving transistor DT is initialized to the third driving voltage VINT and the photo-detecting element PD is reset by turning on the third sensing transistor RT3. In the second period t2 after the first period t1, a data voltage to supplied to the gate electrode of the driving transistor DT to sample the threshold voltage of the driving transistor DT, and the second sensing transistor RT2 is turned on. In the third period t3, light-emitting elements LEL emit light according to the gate voltage of the driving transistor DT and changes in current and voltage of the photo-detecting element PD are sensed.

The k$^{th}$ display emission signal EMk is generated with a first level voltage V1 during the third period t3 and with a second level voltage V2 during the first period t1 and the second period t2. The k$^{th}$ fingerprint scan signal GWk is generated with the first level voltage V1 during the second period t2 and with the second level voltage V2 during the first period t1 and the third period t3.

The k$^{th}$ display initialization signal GIk and the k$^{th}$ display control signal GCk are generated with the first level voltage V1 during the first period t1 and with the second level voltage V2 during the second period t2 and the third period t3. That is to say, the k$^{th}$ display initialization signal GIk may be substantially identical to the k$^{th}$ display control signal GCk.

The p$^{th}$ fingerprint scan signal GWp is generated with the first level voltage V1 during the first period t1 and with the second level voltage V2 during the second period t2 and the third period t3. The p$^{th}$ fingerprint scan signal GWp may be substantially identical to the k$^{th}$ display initialization signal GIk. On the other hand, the p$^{th}$ reset signal RSTp is generated with the second level voltage V2 during the first period t1, and is generated with the first level voltage V1 during the second period t2 and the third period t3.

Each of the first period t1 and the second period t2 may be one horizontal period. One horizontal period refers to a period in which a data voltage is applied to each of the display pixels SPX disposed in one horizontal line, and thus it may be defined as one horizontal line scan period. The display pixels SPX arranged in one horizontal line may be defined as sub-pixels connected to one display initialization line, one display write line, one display control line, and one emission line.

The first level voltage V1 may be a turn-on voltage capable of turning on the first to sixth transistors ST1, ST2, ST3, ST4, ST5 and ST6 and the first sensing transistor RT1. The second level voltage V2 may be a turn-off voltage capable of turning off the first to sixth transistors ST1, ST2, ST3, ST4, ST5 and ST6 and the first sensing transistor RT1. The second level voltage V2 may have a higher level than the first level voltage V1.

Hereinafter, operations of a display pixel SPX during the first period t1, the second period t2 and the third period t3 will be described in conjunction with FIGS. 4 and 7.

Firstly, in the first period t1 the k$^{th}$ display initialization signal GIk having the first level voltage V1 is supplied to the k$^{th}$ display initialization line GILk, and the k$^{th}$ display control signal GCk having the first level voltage V1 is supplied to the k$^{th}$ display control wiring GCLk.

During the first period t1, the first transistor ST1 is turned on by the k$^{th}$ display initialization signal GIk having the first level voltage V1. As the first transistor ST1 is turned on, the third supply voltage VINT of the third supply voltage line VIL is applied to the gate electrode of the driving transistor DT. When the initialization voltage VINT is applied to the gate electrode of the driving transistor DT during the first period t1, the driving transistor DT may be turned on because the voltage Vsg between the first electrode and the gate electrode of the driving transistor DT is greater than the threshold voltage Vth of the driving transistor DT. That is to say, since an on-bias may be applied to the driving transistor DT, the hysteresis characteristics of the driving transistor DT can be improved.

In addition, during the first period t1, the fourth transistor ST4 is turned on by the k$^{th}$ display control signal GCk having the first level voltage V1. Therefore, during the first period t1, as the fourth transistor ST4 is turned on, the anode electrode of the light-emitting element LEL may be initialized to the third supply voltage VINT of the third supply voltage line VIL.

Secondly, during the second period t2, the k$^{th}$ fingerprint scan signal GWk having the first level voltage V1 is supplied to the k$^{th}$ display write line GWLk. Therefore, during the second period t2, each of the second transistor ST2 and the third transistor ST3 is turned on by the k$^{th}$ fingerprint scan signal GWk having the first level voltage V1.

During the second period t2, as the third transistor ST3 is turned on, the gate electrode and the second electrode of the driving transistor DT are connected to each other, and the driving transistor DT works as a diode. In addition, during the second period t2, as the second transistor ST2 is turned on, the data voltage Vdata is applied to the first electrode of the driving transistor DT. At this time, since the voltage between the first electrode and the gate electrode of the driving transistor DT (Vsg=Vdata−VINT) is smaller than the threshold voltage Vth, the driving transistor DT forms a current path until the voltage Vsg between the first electrode and the gate electrode reaches the threshold voltage Vth. Accordingly, the gate electrode and the second electrode of the driving transistor DT increases up to the voltage difference (Vdata−Vth) between the data voltage Vdata and the threshold voltage Vth of the driving transistor DT during the second period t2.

Thirdly, the k$^{th}$ display emission signal EMk having the first level voltage V1 is supplied to the k$^{th}$ emission line Elk during the third period t3. During the third period t3, each of fifth transistor ST5 and the sixth transistor ST6 is turned on by the k$^{th}$ display emission signal EMk having the first level voltage V1.

As the fifth transistor ST5 is turned on, the first electrode of the driving transistor DT is connected to the first supply voltage line VDL. As the sixth transistor ST6 is turned on, the second electrode of the driving transistor DT is connected to the anode electrode of the light-emitting element LEL.

When the fifth transistor ST5 and the sixth transistor ST6 are turned on, the driving current Ids flowing can be supplied to the light-emitting element LEL according to the voltage at the gate electrode of the driving transistor DT. The driving current Ids may be defined as shown in Equation 2 below:

$$Ids = k' \times \{VDD-(Vdata-Vth)-Vth\}^- \quad \text{[Equation 2]}$$

where k' denotes a proportional coefficient determined by the structure and physical properties of the driving transistor, Vth denotes the threshold voltage of the driving transistor, and VDD denotes the first supply voltage from the first supply voltage line VDL, and Vdata denotes the data voltage. The voltage at the gate electrode of the driving transistor DT is equal to Vdata−Vth, and the voltage at the first electrode is equal to VDD. By summarizing Equation 2, Equation 3 below is derived.

$$Ids = k' \times (VDD-Vdata)^- \quad \text{[Equation 3]}$$

Consequently, the driving current Ids is not dependent on the threshold voltage Vth of the driving transistor DT as in Equation 3. That is to say, the threshold voltage Vth of the driving transistor DT can be compensated.

Hereinafter, operations of a light-sensing pixel LSP during the first period t1, the second period t2 and the third period t3 will be described in conjunction with FIGS. 4 and 7.

Firstly, during the first period t1, the $p^{th}$ reset signal RSTp of the second level voltage V2 is supplied to the gate electrode of the third sensing transistor RT3. Accordingly, the third sensing transistor RT3 is turned on by the $p^{th}$ reset signal RSTp of the second level voltage V2 to reset the second electrode of the photo-detecting element PD with the reset voltage source VRST. On the other hand, the $p^{th}$ fingerprint scan signal GWp having the first level voltage V1 is supplied to the gate electrode of the second sensing transistor RT2. The second sensing transistor RT2 is turned off by the $p^{th}$ fingerprint scan signal GWp having the first level voltage V1.

Secondly, during the second period t2 and the third period t3, the $p^{th}$ reset signal RSTp of the first level voltage V1 is supplied to the gate electrode of the third sensing transistor RT3. Thus, the third sensing transistor RT3 remains turn-off. On the other hand, during the second period t2 and the third period t3, the $p^{th}$ fingerprint scan signal GWp of the second level voltage V2 is supplied to the gate electrode of the second sensing transistor RT2. Therefore, the first sensing transistor RT1 may be turned off during the second period t2 and the third period t3. Accordingly, during the second period t2 and the third period t3, the voltage of the sensing anode electrode of the photo-detecting element PD may increase by the incident light. For example, as the amount of light incident on the photo-detecting element PD increases, the voltage at the sensing anode electrode of the photo-detecting element PD may increase.

The $k^{th}$ display initialization signal GIk may be substantially identical to the $p^{th}$ fingerprint scan signal FSp. To this end, the plurality of fingerprint stages FTA1, FTA2, ..., FTAi shown in FIG. 6 may be driven at substantially the same timing as some display stages among the plurality of display stages STA1, STA2, ..., STAm, STA(m+1) shown in FIG. 5.

Figure 8:
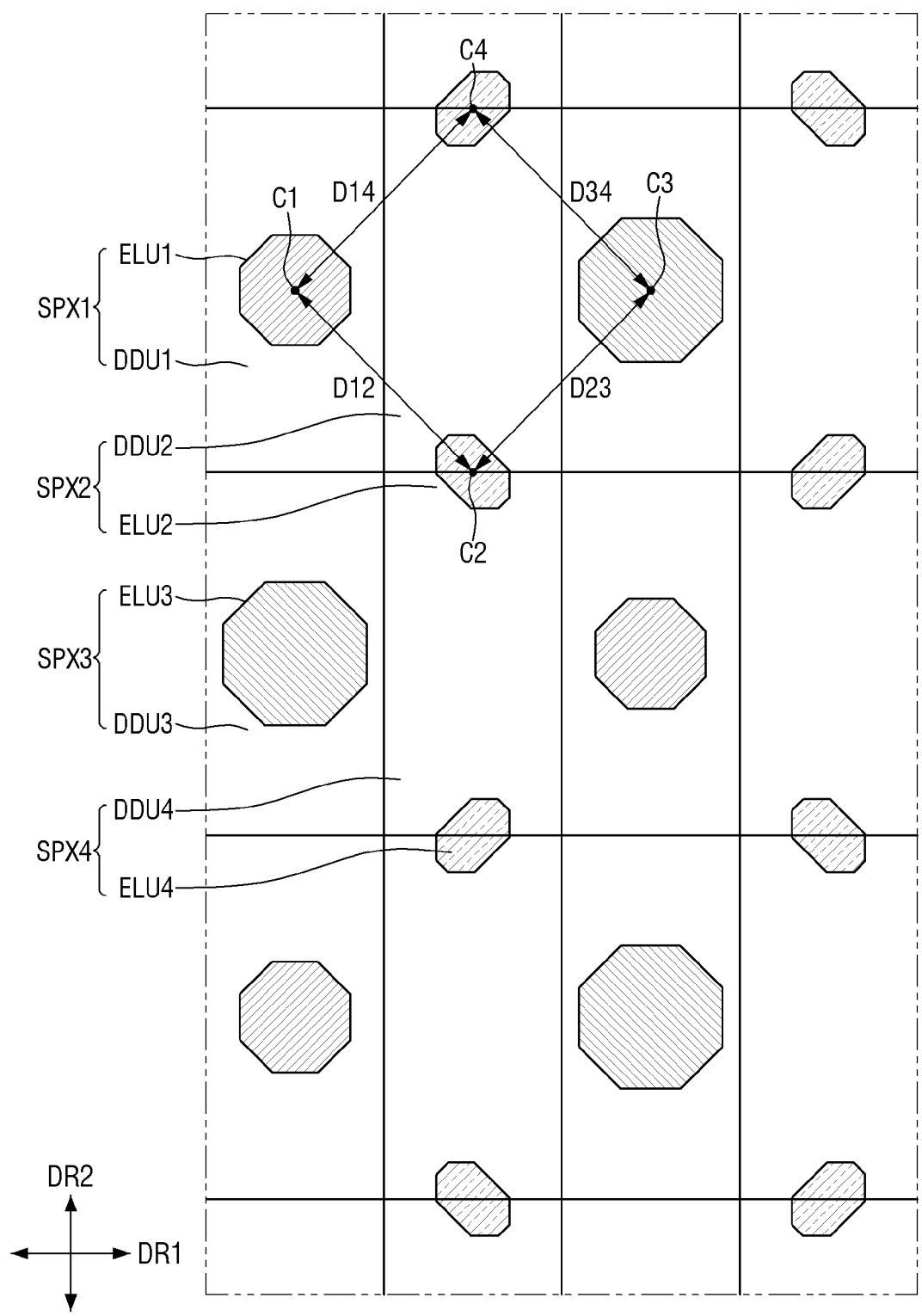
FIG. 8 is a view showing a layout of an image display area according to an embodiment of the present disclosure.

FIG. 8 is a view showing a layout of an image display area according to an embodiment of the present disclosure.

Referring to FIG. 8, the display area DA may include first display pixels SPX1, second display pixels SPX2, third display pixels SPX3, and fourth display pixels SPX4. The display pixels SPX may be divided into first display pixels SPX1, second display pixels SPX2, third display pixels SPX3 and fourth display pixels SPX4. A first display pixel SPX1, a second display pixel SPX2, a third display pixel SPX3 and a fourth display pixel SPX4 may be defined as a unit display pixel. The unit display pixel may be defined as the minimum unit of display pixels capable of representing white light.

The first display pixel SPX1 may include a first light-emitting unit ELU1 that emits first light and a first pixel driving unit DDU1 that applies a driving current to the light-emitting element of the first light-emitting unit ELU1. The first light may be light in a red wavelength range. For example, the main peak wavelength of the first light may be located between approximately 600 nm and 750 nm.

The second display pixel SPX2 may include a second light-emitting unit ELU2 that emits second light and a second pixel driving unit DDU2 that applies a driving current to the light-emitting element of the second light-emitting unit ELU2. The second light may be light in a green wavelength range. For example, the main peak wavelength of the second light may be located between approximately 480 nm and 560 nm.

The third display pixel SPX3 may include a third light-emitting unit ELU3 that emits third light and a third pixel driving unit DDU3 that applies a driving current to the light-emitting element of the third light-emitting unit ELU3. The third light may be light in a blue wavelength range. For example, the main peak wavelength of the third light may be located between approximately 370 nm and 460 nm.

The fourth display pixel SPX4 may include a fourth light-emitting unit ELU4 that emits second light and a fourth pixel driving unit DDU4 that applies a driving current to the light-emitting element of the fourth light-emitting unit ELU4.

In a unit display pixel, the first pixel driving unit DDU1 and the second pixel driving unit DDU2 may be arranged in the first direction DR1, and the third pixel driving unit DDU3 and the fourth pixel driving unit DDU4 may be arranged in the first direction DR1. In the unit display pixel, the first pixel driving unit DDU1 and the third pixel driving unit DDU3 may be arranged in the second direction DR2, and the second pixel driving unit DDU2 and the fourth pixel driving unit DDU4 may be arranged in the second direction DR2.

The first light-emitting unit ELU1 may overlap with the first pixel driving unit DDU1, and the third light-emitting unit ELU3 may overlap with the third pixel driving unit DDU3. The second light-emitting unit ELU2 and the fourth light-emitting unit ELU4 may overlap with the second pixel driving unit DDU2 and the fourth pixel driving unit DDU4, respectively. Each of the second light-emitting unit ELU2 and the fourth light-emitting unit ELU4 may be disposed at the boundary between the second pixel driving unit DDU2 and the fourth pixel driving unit DDU4.

The first light-emitting unit ELU1, the second light-emitting unit ELU2, the third light-emitting unit ELU3 and the fourth light-emitting unit ELU4 may have, but are not limited to, an octagonal shape when viewed from the top. The first light-emitting unit ELU1, the second light-emitting unit ELU2, the third light-emitting unit ELU3 and the fourth light-emitting unit ELU4 may have a quadrangular shape such as a diamond, or a polygonal shape other than a square and an octagon when viewed from the top.

Due to the arrangement positions and planar shapes of the first light-emitting unit ELU1, the second light-emitting unit ELU2, the third light-emitting unit ELU3 and the fourth light-emitting unit ELU4, the distance D12 between the center C1 of the first light-emitting unit ELU1 and the center C2 of the second light-emitting unit ELU2, the distance D23 between the center C2 of the second light-emitting unit ELU2 and the center C3 of the third light-emitting unit ELU3, the distance D14 between the center C1 of the first light-emitting unit ELU1 and the center C4 of the fourth light-emitting unit ELU4, and the distance D34 between the center C3 of the third light-emitting unit ELU3 and the center C4 of the fourth light-emitting unit ELU4 may be substantially all equal.

Figure 9:
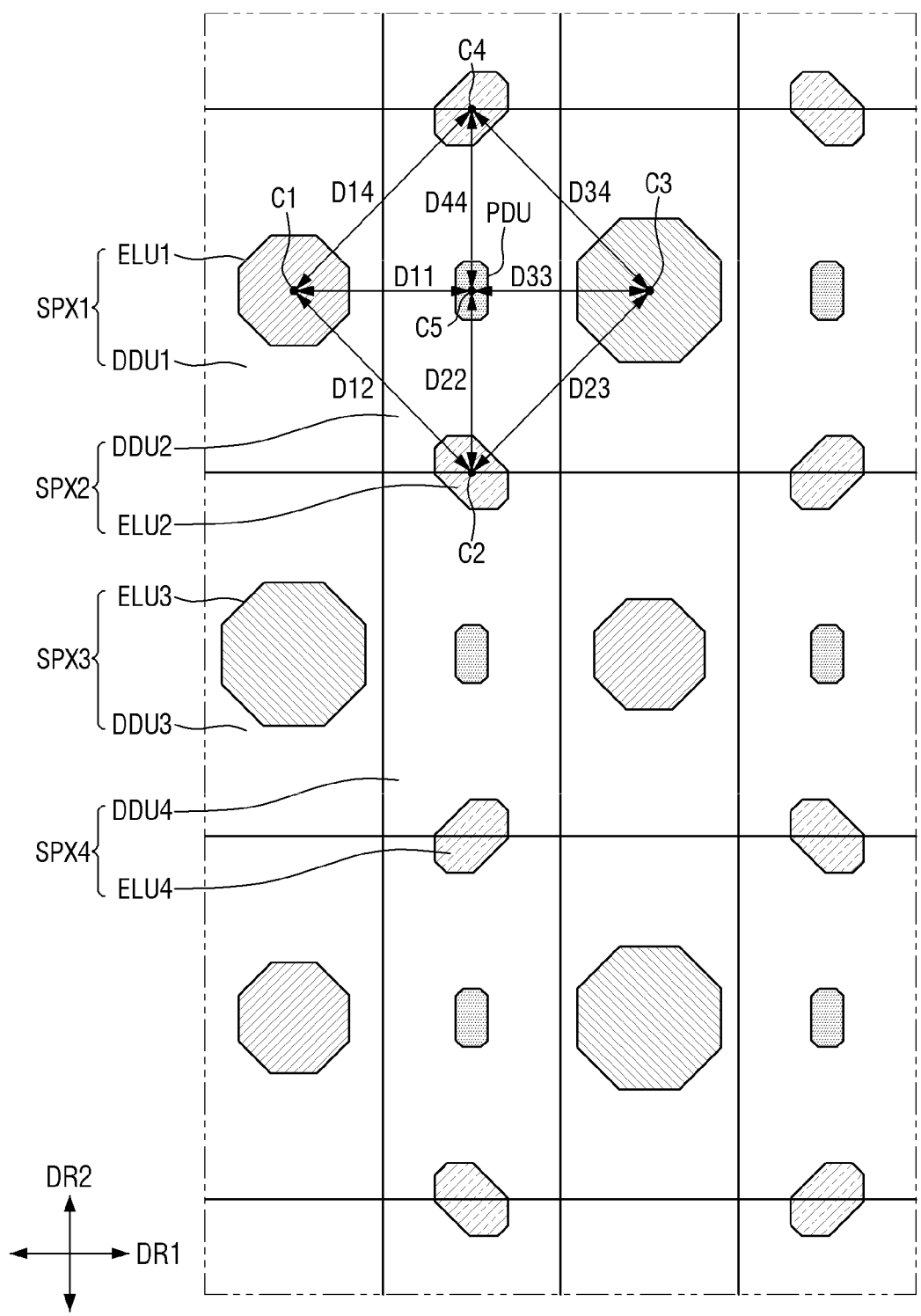
FIG. 9 is a view showing a layout of a fingerprint sensing area according to an embodiment.

FIG. 9 is a view showing a layout of a fingerprint sensing area according to an embodiment.

An image display area IDA shown in FIG. 9 is substantially identical to the image display area IDA shown in FIG. 8 except that a fingerprint sensing area FSA further includes photo-detecting elements PD of photo-detecting unit PDU; and, therefore, the redundant descriptions will be omitted.

Each of the photo-detecting units PDU may be disposed between the first light-emitting unit ELU1 and the third light-emitting unit ELU3 adjacent to each other in the first direction DR1, and between the second light-emitting unit ELU2 and the fourth light-emitting unit ELU4 adjacent to each other in the second direction DR2.

At least one photo-detecting unit PDU may be disposed in a unit display pixel. The photo-detecting unit PDU may overlap with the second pixel driving unit DDU2 or the fourth pixel driving unit DDU4. Since the second pixel driving unit DDU2 and the fourth pixel driving unit DDU4 are arranged alternately in the second direction DR2, the photo-detecting unit PDU overlapping with the second pixel driving unit DDU2 and the photo-detecting unit PDU overlapping with the fourth pixel driving unit DDU4 may be arranged alternately in the second direction DR2.

Each of the photo-detecting units PDU may have, but is not limited to, an octagonal shape when viewed from the top. Each of the photo-detecting units PDU may have a quadrangular shape such as a diamond when viewed from the top, or a polygonal shape other than a quadrangle and an octagon when viewed from the top.

Due to the arrangement positions and planar shapes of the first light-emitting unit ELU1, the second light-emitting unit ELU2, the third light-emitting unit ELU3, the fourth light-emitting unit ELU4 and the photo-detecting unit PDU, the distance D11 between the center C1 of the first light-emitting unit ELU1 and the center C5 of the photo-detecting unit PDU, the distance D22 between the center C2 of the second light-emitting unit ELU2 and the center C5 of the photo-detecting unit PDU, the distance D33 between the center C3 of the third light-emitting unit ELU3 and the center C5 of the photo-detecting unit PDU, and the distance D44 between the center C4 of the fourth light-emitting unit ELU4 and the center C5 of the photo-detecting unit PDU may be substantially all equal.

Figure 10:
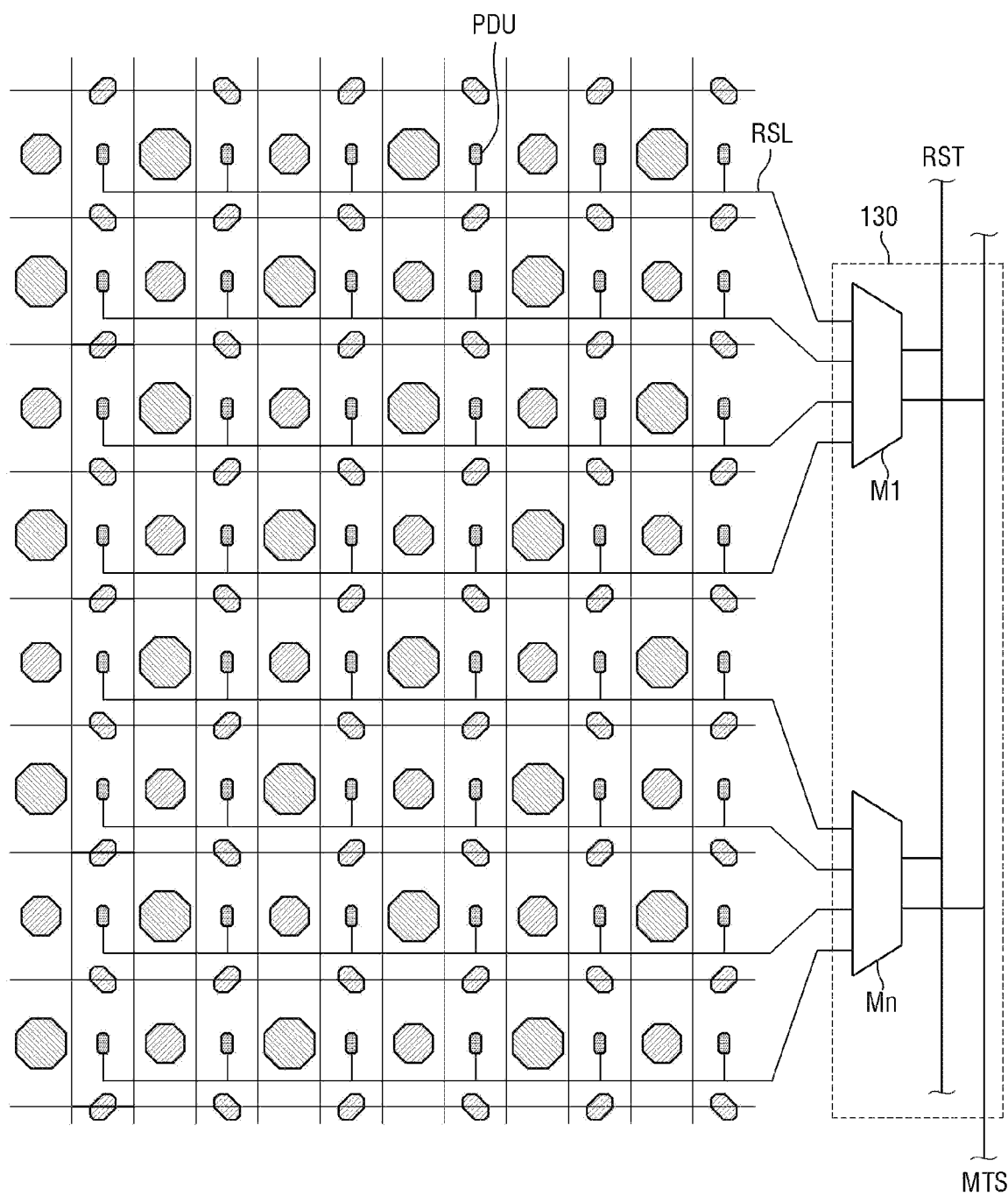
FIG. 10 is a block diagram illustrating an example of a light-sensing reset driver connected to photo-detecting units for each horizontal line in the fingerprint sensing area.

FIG. 10 is a block diagram illustrating an example of a light-sensing reset driver 130 connected to photo-detecting units PDU for each horizontal line in the fingerprint sensing area.

As described above, the sense driving units FDU and the photo-detecting units PDU of the light-sensing pixels LSP may be disposed in the fingerprint sensing area FSA. In the following description, a structure in which the light-sensing pixels LSP are disposed in the fingerprint sensing area FSA will be described as an example for convenience of illustration.

Referring to FIG. 10, the light-sensing reset driver 130 may sequentially apply the $p^{th}$ reset signals RSTp to the fingerprint reset lines RSL connected to the photo-detecting units PDU for each horizontal line in response to the line select signal MTS applied from the timing controller 220 of the display driving circuit 200.

The sense driving units FDU of the light-sensing pixels LSP arranged ion the same horizontal line are connected to the same fingerprint reset line RSL. Accordingly, the sense driving units FDU arranged in the same horizontal line may reset the photo-detecting units PDU at the same timing in response to the $p^{th}$ reset signal RSTp.

The light-sensing reset driver 130 includes first to $n^{th}$ multiplexers M1 to Mn, where n is a natural number. Each of the first to $n^{th}$ multiplexers M1 to Mn is connected to the $(4n-3)^{th}$ to the $4n^{th}$ fingerprint reset lines RSL among the fingerprint reset lines RSL, and may sequentially apply the $p^{th}$ reset signals RSTp to the $(4n-3)^{th}$ to the $4n^{th}$ fingerprint reset lines RSL in response to the line select signal MTS. Accordingly, the sense driving units FDU for each horizontal line connected to the respective one of the $(4n-3)^{th}$ to the $4n^{th}$ fingerprint reset lines RSL may reset the photo-detecting units PDU at the same timing in response to the $p^{th}$ reset signals RSTp which are sequentially input. In addition, the sense driving units FDU control the photo-detecting units PDU so that they sense light in response to the $p^{th}$ fingerprint scan signal GWp for several frame periods until the next $p^{th}$ reset signal RSTp is input.

Figure 11:
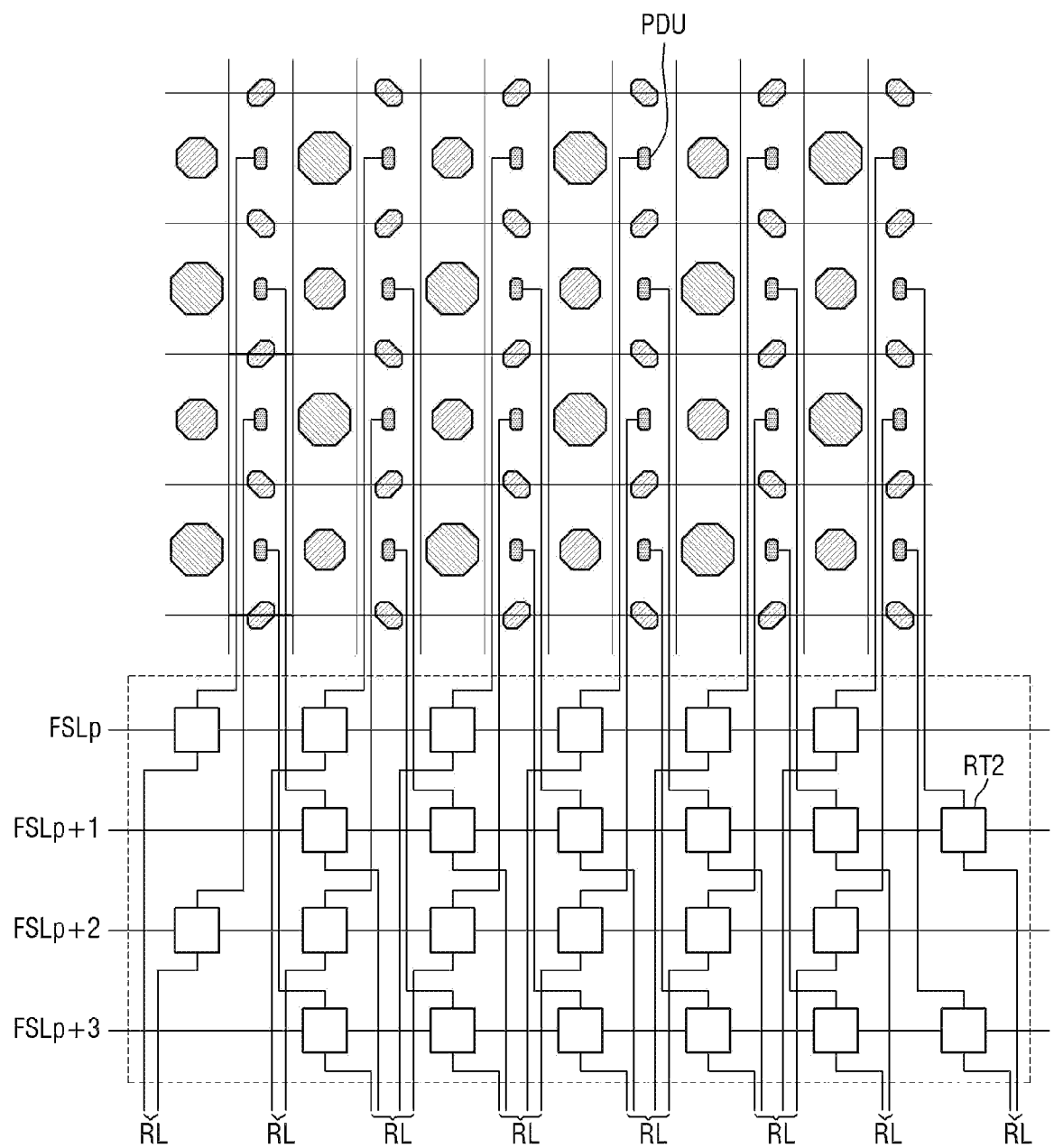
FIG. 11 is a block diagram illustrating an example of photo-detecting units of a fingerprint sensing area and sense driving units of the fingerprint driving area according to an embodiment.

FIG. 11 is a block diagram illustrating an example of photo-detecting units of a fingerprint sensing area and sense driving units of the fingerprint driving area according to an embodiment.

FIG. 11 illustrates sense driving units FDU associated with the photo-detecting units PDU of the $(4n-3)^{th}$ to $4n^{th}$ horizontal lines for convenience of illustration.

The second sensing transistors RT2 of the sense driving units FDU are connected to the photo-detecting units PDU and the sensing lines RL, respectively, and transmit light-sensing signals of the photo-detecting units PDU to the respective sensing lines RL in response to the respective fingerprint scan signals FSp.

Specifically, the second sensing transistors RT2 all connected to the $p^{th}$ fingerprint scan line FSLp are electrically connected to the respective photo-detecting units PDU arranged in the $(4n-3)^{th}$ horizontal line and the respective sensing lines RL. The second sensing transistors RT2 all connected to the $(p+1)^{th}$ fingerprint scan line FSL(p+1) are electrically connected to the respective photo-detecting units PDU arranged in the $(4n-2)^{th}$ horizontal line and the respective sensing lines RL. The second sensing transistors RT2 all connected to the $(p+_2)^{th}$ fingerprint scan line FSL(p+2) are electrically connected to the respective photo-detecting units PDU arranged in the $(4n-1)^{th}$ horizontal line and the respective sensing lines RL. The second sensing transistors RT2 all connected to the $(p+3)^{th}$ fingerprint scan line FSL(p+3) are electrically connected to the respective photo-detecting units PDU arranged in the $4n^{th}$ horizontal line and the respective sensing lines RL.

The second sensing transistors RT2 all connected to the $p^{th}$ fingerprint scan line FSLp are turned on in response to the $p^{th}$ fingerprint scan signal, and electrically connect the respective photo-detecting units PDU arranged in the $(4n-3)^{th}$ horizontal line with the respective sensing lines RL. The second sensing transistors RT2 all connected to the $(p+1)^{th}$ fingerprint scan line FSL(p+1) are turned on in response to the $(p+1)^{th}$ fingerprint scan signal, and electrically connect the respective photo-detecting units PDU arranged in the $(4n-2)^{th}$ horizontal line with the respective sensing lines RL. The second sensing transistors RT2 all connected to the $(p+2)^{th}$ fingerprint scan line FSL(p+2) are turned on in response to the $(p+2)^{th}$ fingerprint scan signal, and electrically connect the respective photo-detecting units PDU arranged in the $(4n-1)^{th}$ horizontal line with the respective sensing lines RL. The second sensing transistors RT2 all connected to the $(p+3)^{th}$ fingerprint scan line FSL(p+3) are turned on in response to the $(p+3)^{th}$ fingerprint scan signal, and electrically connect the respective photo-detecting units PDU arranged in the $4n^{th}$ horizontal line with the respective sensing lines RL. Accordingly, the fingerprint driving circuit 400 may recognize a fingerprint of a finger according to sensing signals or sensing voltages input through the respective sensing lines RL.

Figure 12:
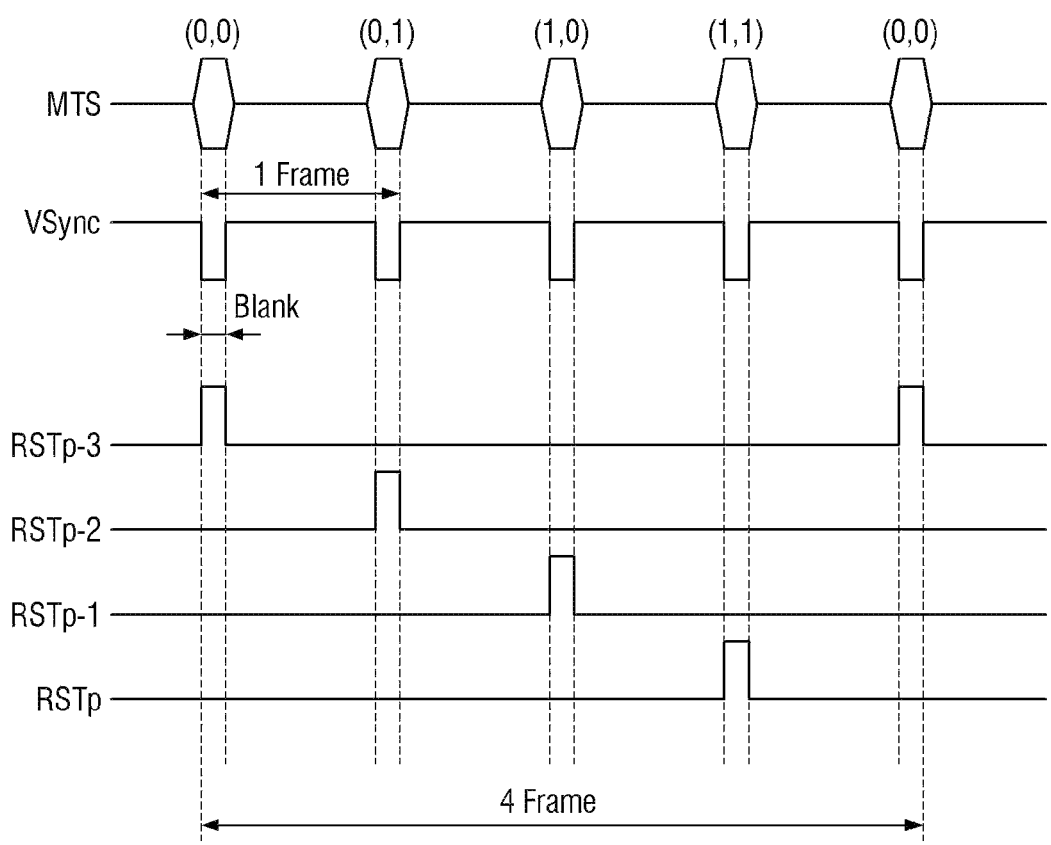
FIG. 12 is a timing diagram illustrating a line select signal input to multiplexers of the light-sensing reset driver and reset signals output from the multiplexers.

FIG. 12 is a timing diagram illustrating a line select signal input to multiplexers of the light-sensing reset driver and reset signals output from the multiplexers.

Referring to FIGS. 10 and 12, the timing controller 220 of the display driving circuit 200 may supply a line select signal MTS to the multiplexers M1 to Mn of the light-sensing reset driver 130 at least every frame. The line select signal MTS may be a digital signal that sequentially selects from among the $(4n-3)^{th}$, $(4n-2)^{th}$, $(4n-1)^{th}$ and $4n^{th}$ fingerprint reset lines RSL in a blank period of each frame period. The multiplexers M1 to Mn sequentially supply the $(4n-3)^{th}$ to $4n^{th}$ reset signals RST(p-3) to RSTp to the $(4n-3)^{th}$, $(4n-2)^{th}$, $(4n-1)^{th}$ and $4n^{th}$ fingerprint reset lines RSL in response to the line select signal MTS sequentially input in the blank period of each frame period.

The timing controller 220 generates the line select signal MTS so that the $(4n-3)^{th}$ to $4n^{th}$ fingerprint reset lines RSL are sequentially selected in each blank period every one frame period (1Frame) to supply it to each of the multiplexers M1 to Mn. Each of the multiplexers M1 to Mn sequentially selects the $(4n-3)^{th}$ to $4n^{th}$ fingerprint reset lines RSL for four frame periods in response to the line select signal MTS, and sequentially supplies the $(4n-3)^{th}$ to $4n^{th}$ reset signals RST(p-3) to RSTp to the $(4n-3)^{th}$ to $4n^{th}$ fingerprint reset lines RSL. In this instance, the sense driving units FDU for each horizontal line may reset the photo-detecting units PDU at the same timing in response to the reset signals RST(p-3) to RSTp which are sequentially input. In addition, the sense driving units FDU control the photo-detecting units PDU so that they sense light in response to the fingerprint scan signal GWp for several frame periods until the next reset signal is input. Accordingly, the photo-detecting units PDU for each horizontal line may sense light during four frame periods (4 Frame) after they have been reset.

Figure 13:
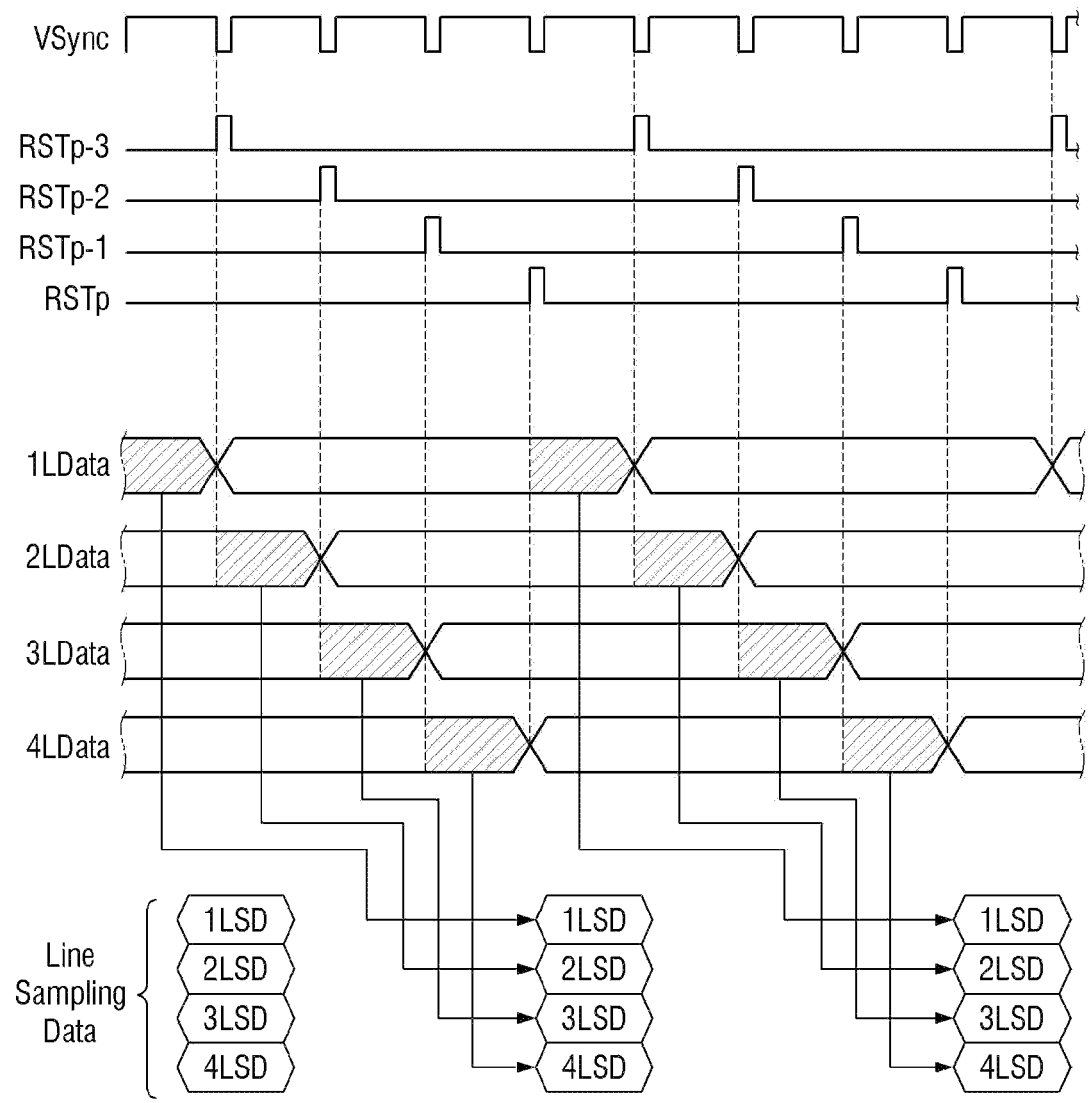
FIG. 13 is a view for illustrating a method of aligning light-sensing data and a method of recognizing a fingerprint by a fingerprint driving circuit according to an embodiment.

FIG. 13 is a view for illustrating a method of aligning light-sensing data and a method of recognizing a fingerprint by a fingerprint driving circuit according to an embodiment.

The photo-detecting units PDU for each horizontal line sense light for four frame periods (4Frames) after they have been reset, and the second sensing transistors RT2 of the sense driving units FDU transmit the light-sensing signals of the photo-detecting units PDU to the respective sensing lines RL in response to the fingerprint scan signal FSp.

The fingerprint driving circuit 400 performs analog-to-digital conversion on the light-sensing signals or the sensing voltages input through the sensing lines RL at least every frame period to generate light-sensing data 1LData to 4LData.

Since the photo-detecting units PDU for each horizontal line sense light for four frame periods (4Frames) after they have been reset, the fingerprint driving circuit 400 may generate the light-sensing data 1LData to 4LData for four frame periods for each horizontal line.

The fingerprint driving circuit 400 samples the light-sensing data 1LData to 4LData for at least one frame from the light-sensing data 1LData to 4LData for four frame periods for each horizontal line to detect the sampling sensing data 1LSD to 4LSD.

By sampling the sensing data 1LSD to 4LSD for the fourth frame period, which is detected lastly among the light-sensing data 1LData to 4LData for four frame periods, the accuracy of sensing fingerprint can be improved. The fingerprint driving circuit 400 may authenticate a fingerprint by combining and analyzing the sampling sensing data 1LSD to 4LSD.

Figure 14:
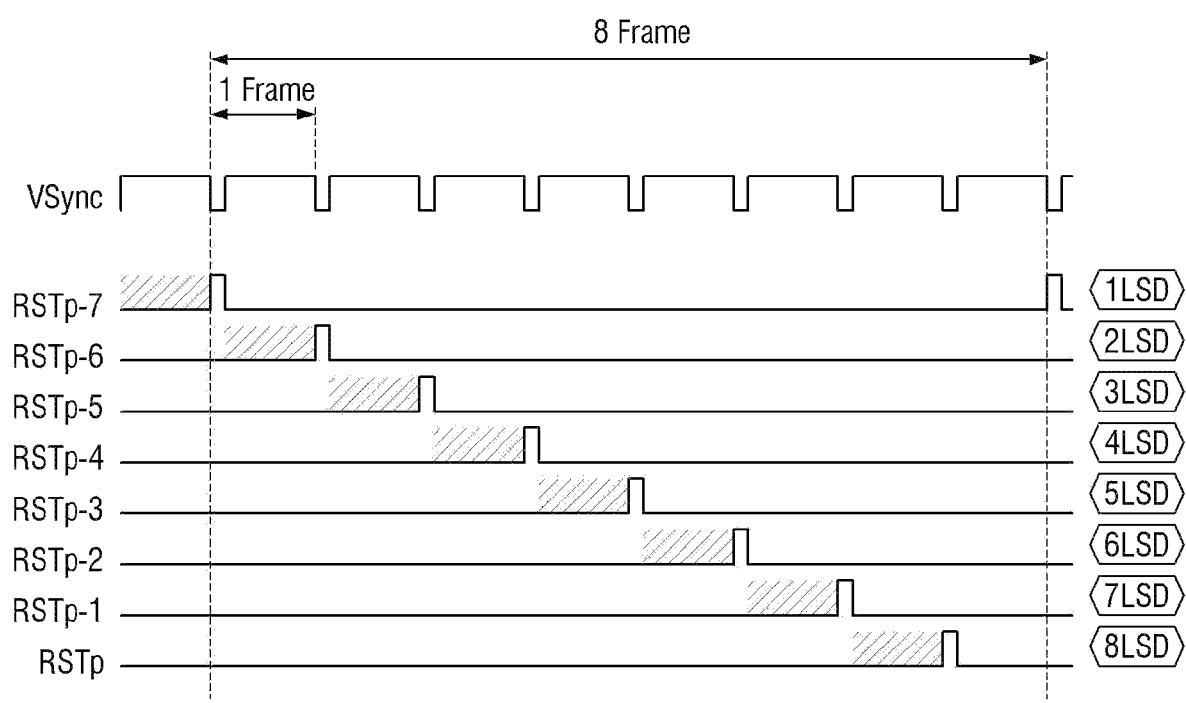
FIG. 14 is a diagram for illustrating a method of aligning reset signals of multiplexers and light-sensing data of a fingerprint driving circuit according to an embodiment of the present disclosure.

FIG. 14 is a diagram for illustrating a method of aligning reset signals of multiplexers and light-sensing data of a fingerprint driving circuit according to an embodiment of the present disclosure.

Referring to FIG. 14, each of the first to nth multiplexers M1 to Mn included in the light-sensing reset driver 130 may be connected to the $(8n-7)^{th}$ to $8n^{th}$ fingerprint reset lines RSL among the fingerprint reset lines RSL. The first to $n^{th}$ multiplexers M1 to Mn sequentially supplies $(8n-7)^{th}$ to $8n^{th}$ reset signals RST(p-7) to RSTp to the $(8n-7)^{th}$ to $8n^{th}$ fingerprint reset lines RSL in response to the line select signal MTS. The line select signal MTS may be a digital signal that sequentially selects the $(8n-7)^{th}$ to $8n^{th}$ fingerprint reset lines RSL in the blank period of each frame period.

Each of the multiplexers M1 to Mn sequentially selects the $(8n-7)^{th}$ to $8n^{th}$ fingerprint reset lines RSL for four frame periods in response to the line select signal MTS, and sequentially supplies the $(8n-7)^{th}$ to $8n^{th}$ reset signals RST(p-7) to RSTp to the $(8n-7)^{th}$ to $8n^{th}$ fingerprint reset lines RSL. In this instance, the sense driving units FDU for each horizontal line may reset the photo-detecting units PDU at the same horizontal line in response to the reset signals RST(p-7) to RSTp which are sequentially input. Then, the sense driving units FDU control the photo-detecting units PDU so that they sense light in response to the fingerprint scan signal GWp for eight frame periods until the next reset signal is input. Accordingly, the photo-detecting units PDU for each horizontal line may sense light during eight frame periods (8 Frame) after they have been reset. The second sensing transistors RT2 of the sense driving units FDU may transmit light-sensing signals for eight frame periods to the respective sensing lines RL in response to the fingerprint scan signal FSp.

The fingerprint driving circuit 400 performs analog-to-digital conversion on the light-sensing signals or the sensing voltages input through the sensing lines RL at least every frame period to generate light-sensing data.

Since the photo-detecting units PDU for each horizontal line sense light for eight frame periods (8Frames) after they have been reset, the fingerprint driving circuit 400 may generate the light-sensing data for eight frame periods for each horizontal line.

The fingerprint driving circuit 400 detects the sampling sensing data 1LSD to 8LSD by sampling the light-sensing data for at least one frame from the light-sensing data for eight frame periods for each horizontal line. By sampling the sensing data 1LSD to 8LSD for the eighth frame period (the hatched period in FIG. 14), which is detected lastly among the light-sensing data for eight frame periods, the accuracy of sensing fingerprint can be improved. The fingerprint driving circuit 400 may authenticate a fingerprint by combining and analyzing the sampling sensing data 1LSD to 8LSD.

According to an embodiment, each of the first to $n^{th}$ multiplexers M1 to Mn included in the light-sensing reset driver 130 may be connected to the fingerprint reset lines RSL for six, ten, twelve, sixteen or more horizontal lines among the fingerprint reset lines RSL depending on the resolution of the display area DA.

Each of the multiplexers M1 to Mn sequentially selects from among a plurality of fingerprint reset lines RSL for a predetermined several frame periods in response to the line select signal MTS, and sequentially supplies the plurality of reset signals RSTp to the plurality of fingerprint reset lines RSL. In addition, the sense driving units FDU may control the photo-detecting units PDU so that they sense light in response to the fingerprint scan signal GWp for several frame periods until the next reset signal is input. Accordingly, the photo-detecting units PDU for each horizontal line may sense light during several frame periods after they have been reset.

The fingerprint driving circuit 400 may generate light-sensing data for a plurality of frame periods for each horizontal line. In addition, the fingerprint driving circuit 400 may detect sampling sensing data by sampling the light-sensing data for at least one frame from the light-sensing data for the plurality of frame periods. The fingerprint driving circuit 400 may authenticate a fingerprint by combining and analyzing the sampling sensing data.

Figure 15:
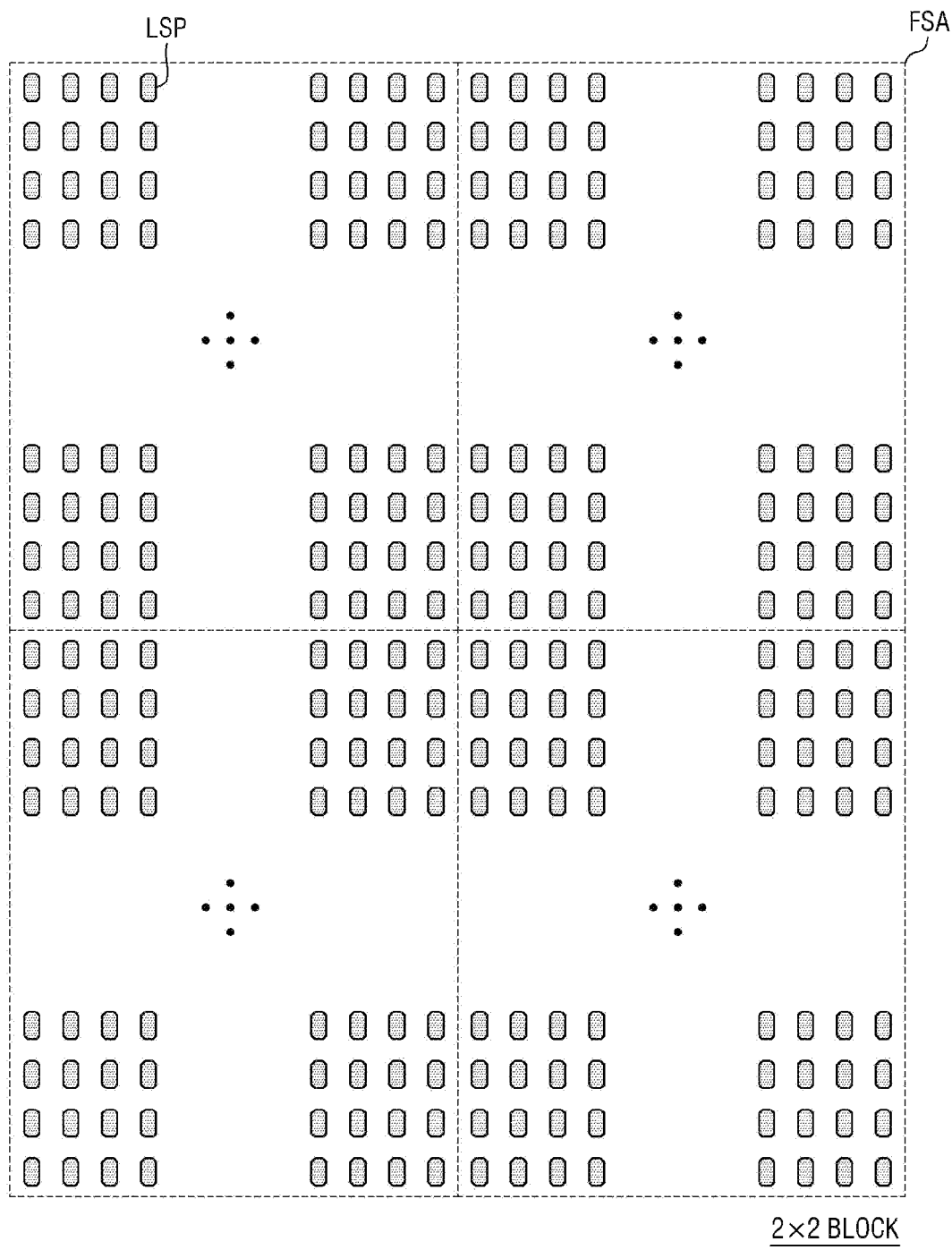
FIG. 15 is a diagram for illustrating a method of using the average value of sampling sensing data of a fingerprint driving circuit according to an embodiment of the present disclosure.

FIG. 15 is a diagram for illustrating a method of using the average value of sampling sensing data of a fingerprint driving circuit according to an embodiment of the present disclosure.

Referring to FIG. 15, the fingerprint driving circuit 400 may divide the fingerprint sensing area FSA into a plurality of divided areas, e.g., 2×2 blocks, and may calculate the average of data values of light-sensing data or sampling sensing data of each of the divided areas. Accordingly, the fingerprint driving circuit 400 may authenticate a fingerprint by combining the average data values of the light-sensing data or sampling sensing data of the each of the divided blocks.

$$SNR_{TOUCH} = \frac{\text{Signal}}{\text{Noise}} = \frac{AVG_{TOUCH} - AVG_{BG}}{(STD_{TOUCH} + STD_{BG})/2} \quad \text{[Equation 4]}$$

where $SNR_{TOUCH}$ denotes touch accuracy, Signal denotes touch sensitivity, and Noise denotes an inaccuracy factor. In addition, $AVG_{TOUCH}$ denotes the among of the light-sensing signal, $AVG_{BG}$ denotes the magnitude of the background signal, and $STD_{TOUCH}$ and $STD_{BG}$ denote the magnitudes of the inaccuracy factors according to the touch and the background.

As shown in Equation 4, as the inaccuracy factor such as noise becomes smaller, the accuracy of the touch can be improved. The fingerprint driving circuit 400 divides the fingerprint sensing area FSA into a plurality of divided areas, and calculates the average of data values of the light-sensing data or sampling sensing data of each of the divided areas, so that it is possible to reduce the magnitude of the inaccuracy factor.

Figure 16:
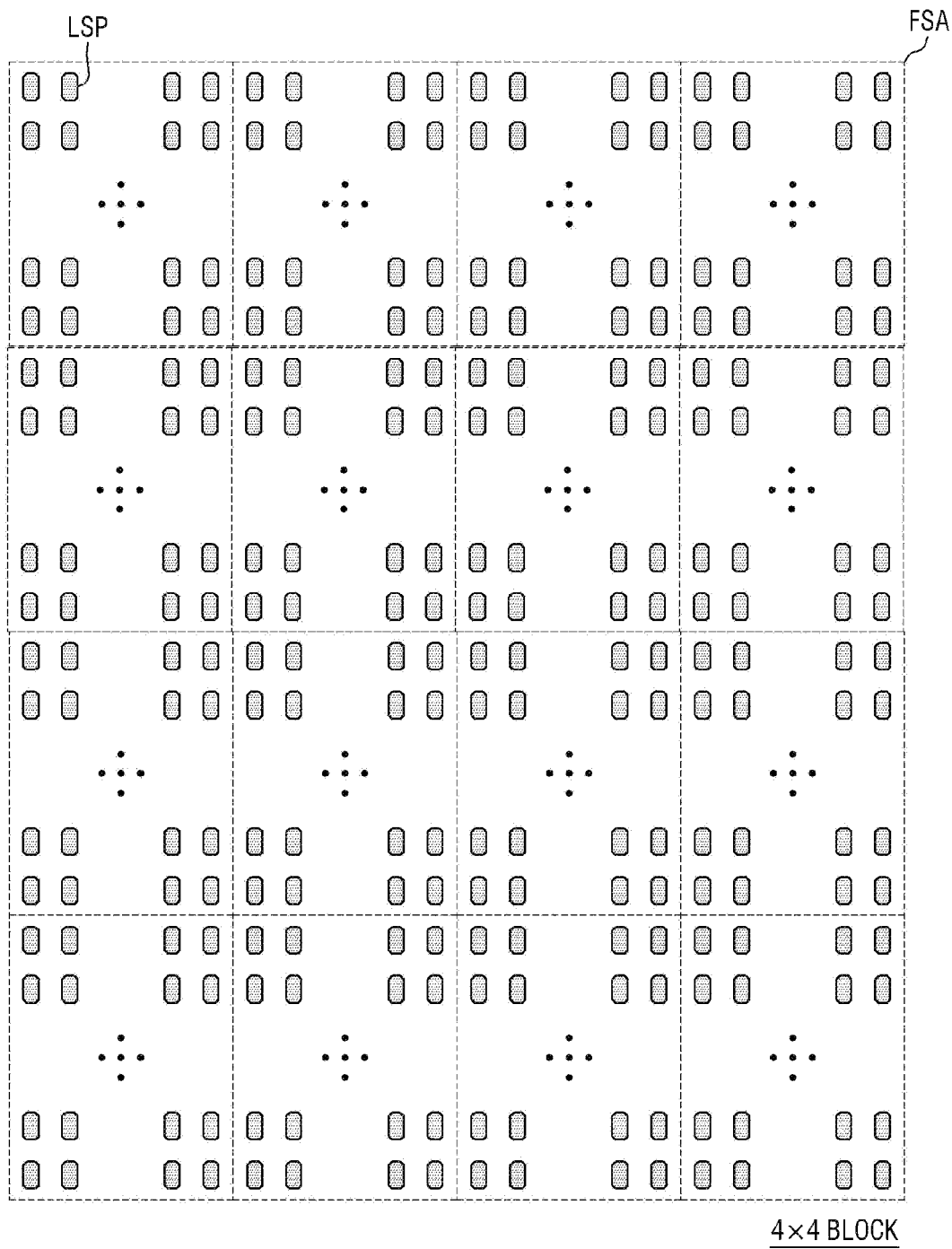
FIG. 16 is a diagram for illustrating a method of using average values of sampling sensing data of a fingerprint driving circuit according to an embodiment of the present disclosure.

FIG. 16 is a diagram for illustrating a method of using average values of sampling sensing data of a fingerprint driving circuit according to an embodiment of the present disclosure.

Referring to FIG. 16, the fingerprint driving circuit 400 may divide the fingerprint sensing area FSA into 4×4 blocks and may calculate the average of data values of light-sensing data or sampling sensing data of each of the divided blocks. Accordingly, the fingerprint driving circuit 400 may authenticate a fingerprint by combining the average data values of the light-sensing data or sampling sensing data of the each of the divided blocks. The fingerprint driving circuit 400 divides the fingerprint sensing area FSA into a plurality of divided areas, and calculates the average of data values of the light-sensing data or sampling sensing data of each of the divided areas, so that it is possible to reduce the magnitude of the inaccuracy factor.

TABLE 1

|  | Option 0 | Option 1 | Option 2 | Option 3 | Option 4 |
| --- | --- | --- | --- | --- | --- |
| MUX ratio | 4:1 | 4:1 | 16:1 | 16:1 | 4:1 |
| Block Averaging | 1 × 1 | 4 × 4 | 1 × 1 | 4 × 4 | 8 × 8 |
| EIT | 32 ms | 32 ms | 128 ms | 128 ms | 32 ms |
| Pitch | 1 mm | 1 mm | 4 mm | 4 mm | 1 mm |
| Data size (16 bit ADC) | 150 KB | 150 KB | 150 KB | 9 KB | 38 KB |

Referring to Table 1, each of the first to $n^{th}$ multiplexers M1 to Mn included in the light-sensing reset driver 130 may be connected to the fingerprint reset lines RSL for four, eight, twelve, sixteen or more horizontal lines among the fingerprint reset lines RSL depending on the resolution of the display area DA. Each of the multiplexers M1 to Mn sequentially selects from among a plurality of fingerprint reset lines RSL for a predetermined several frame periods in response to the line selection signal MTS, and sequentially supplies the plurality of reset signals RSTp to the plurality of fingerprint reset lines RSL. Accordingly, the photo-detecting units PDU for each horizontal line may sense light during several frame periods after they have been reset. With the display driving circuit 200 and the light-sensing reset driver 130 of the present disclosure, the light-sensing period is increased so that the photo-detecting units PDU for each horizontal line can sense light during a plurality of frame periods, so that the accuracy of touch sensing can be further improved.

In addition, the fingerprint driving circuit 400 divides the fingerprint sensing area FSA into a plurality of sub-divided areas, such as 2×2, 4×4, 6×6 and 8×8 blocks, and calculates the average of data values of the light-sensing data or sampling sensing data of the divided areas, so that it is possible to reduce the magnitude of the inaccuracy factor.

Figure 17:
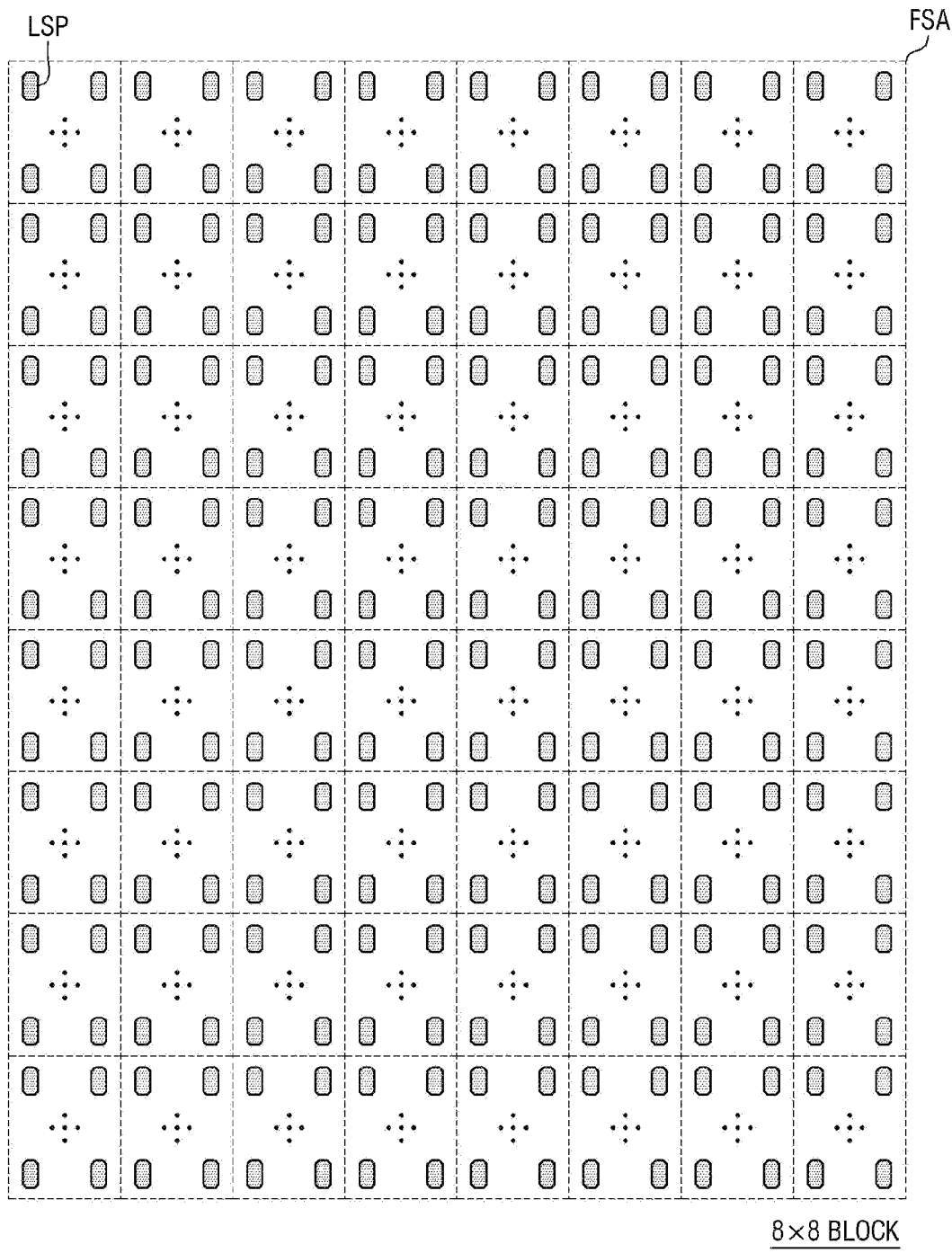
FIG. 17 is a diagram for illustrating a method of using the average value of sampling sensing data of a fingerprint driving circuit according to an embodiment of the present disclosure.

FIG. 17 is a diagram for illustrating a method of using the average value of sampling sensing data of a fingerprint driving circuit according to an embodiment of the present disclosure.

Referring to FIG. 17, the fingerprint driving circuit 400 may divide the fingerprint sensing area FSA into 8×8 blocks and may calculate the average of data values of light-sensing data or sampling sensing data of each of the divided blocks. Accordingly, the fingerprint driving circuit 400 may authenticate a fingerprint by combining the average data values of the light-sensing data or sampling sensing data of the each of the divided blocks. The fingerprint driving circuit 400 divides the fingerprint sensing area FSA into a plurality of divided areas, such as 8×8 blocks, and calculates the average of data values of the light-sensing data or sampling sensing data of each of the divided areas, so that it is possible to reduce the magnitude of the inaccuracy factor.

The display device 10 of the present disclosure may be utilized by combining the technique for increasing the light-sensing period of the photo-detecting units PDU for each horizontal line and the technique for calculating the average of data values of each of the divided areas of the fingerprint driving circuit 400.

Accordingly, the light-sensing period of the photo-sensing pixels LSP can be increased and the fingerprint can be recognized by sampling the photo-sensing data, thereby increasing the light-sensing period and photo-sensing accuracy of the display device 10. In addition, the fingerprint sensing accuracy of the display device 10 can be improved while reducing noise by using the average value of the light-sensing data for each divided area.

Figure 18:
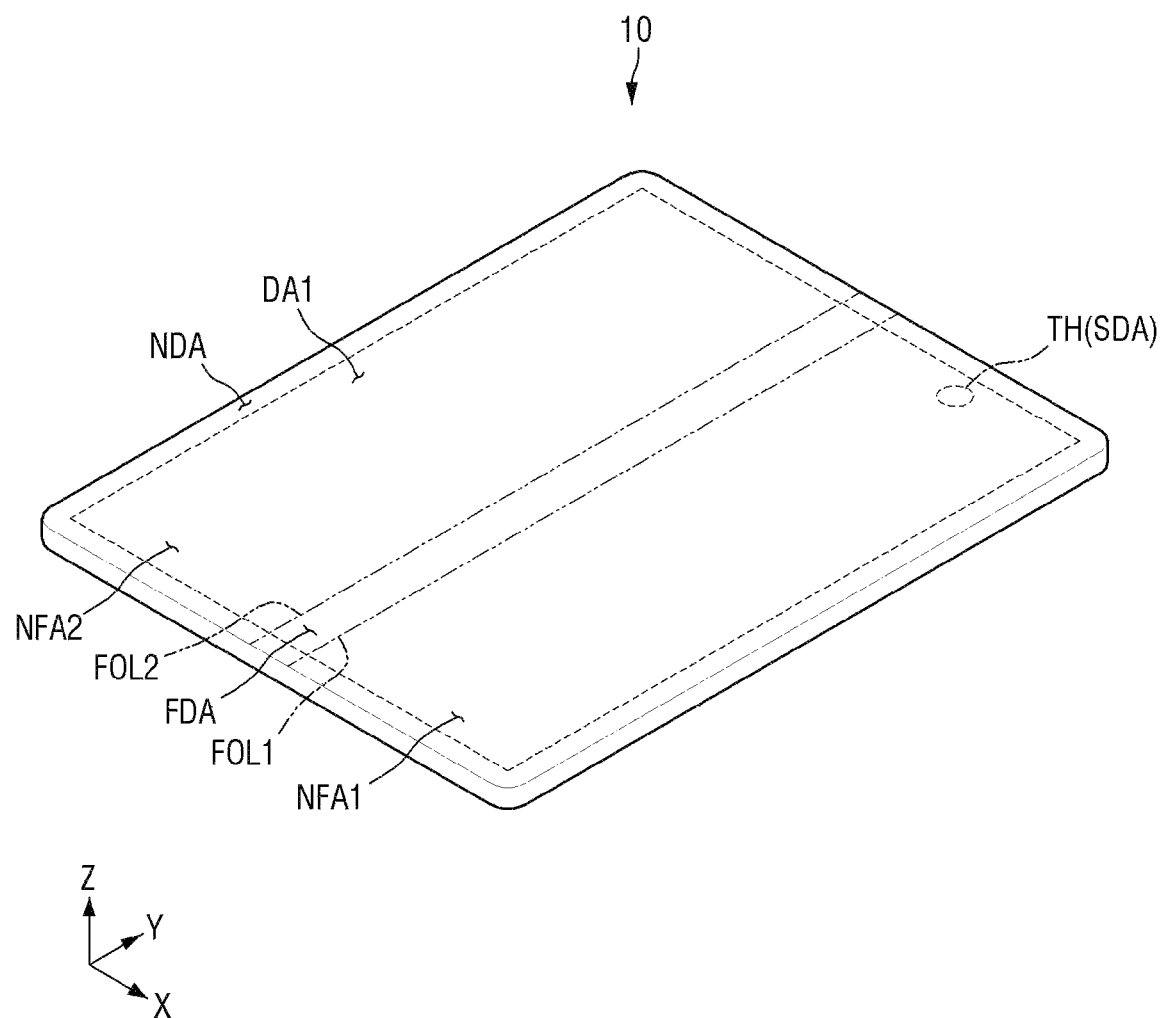
FIGS. 18 and 19 are perspective views showing a display device according to an embodiment.
Figure 19:
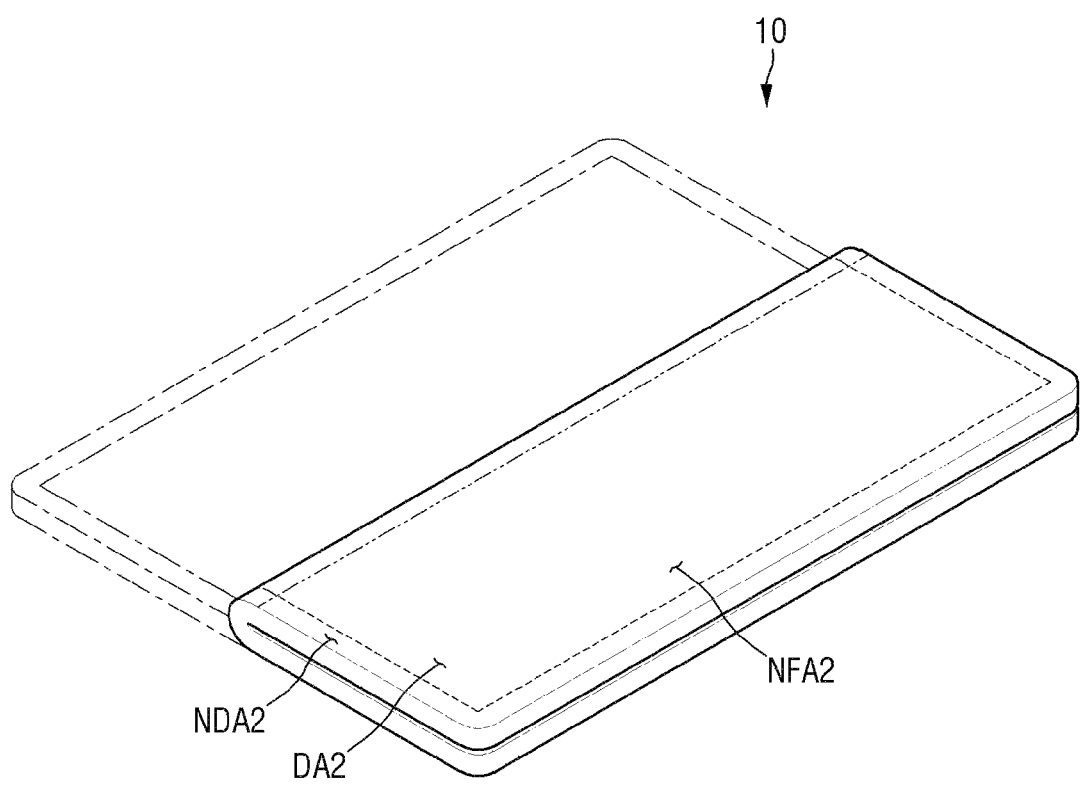

FIGS. 18 and 19 are perspective views showing a display device 10 according to an embodiment.

In the example shown in FIGS. 18 and 19, a display device 10 is a foldable display device that can be folded in the first direction, e.g., x-axis direction. The display device 10 may remain folded as well as unfolded. The display device 10 may be folded inward (in-folding manner) such that the front surface is located inside. When the display device 10 is bent or folded in the in-folding manner, a part of the front surface of the display device 10 may face the other part of the front surface. Alternatively, the display device 10 may be folded outward (out-folding manner) such that the front surface is located outside. When the display device 10 is bent or folded in the out-folding manner, a part of the rear surface of the display device 10 may face the other part of the rear surface.

The first non-folding area NFA1 may be disposed on one side, for example, the right side of the folding area FDA. The second non-folding area NFA2 may be disposed on the opposite side, for example, the left side of the folding area FDA. The touch sensing unit TSU according to the embodiment of the present disclosure may be formed and disposed on each of the first non-folding area NFA1 and the second non-folding area NFA2.

The first folding line FOL1 and the second folding line FOL2 may be extended in the second direction, e.g., y-axis direction, and the display device 10 may be folded in the first direction, e.g., x-axis direction. As a result, the length of the display device 10 in the first direction, e.g., the x-axis direction, may be reduced to about half, so that a user can carry the display device 10 easily.

The direction in which the first folding line FOL1 and the second folding line FOL2 are extended is not limited to the second direction, e.g., y-axis direction. For example, the first folding line FOL1 and the second folding line FOL2 may be extended in the first direction, e.g., x-axis direction, and the display device 10 may be folded in the second direction, e.g., y-axis direction. In such case, the length of the display device 10 in the second direction, e.g., y-axis direction, may be reduced to about half. Alternatively, the first folding line FOL1 and the second folding line FOL2 may be extended in a diagonal direction of the display device 10 between the first direction, e.g., x-axis direction, and the second direction, e.g., y-axis direction. In such case, the display device 10 may be folded in a triangle shape.

When the first folding line FOL1 and the second folding line FOL2 are extended in the second direction, e.g., y-axis direction, the length of the folding area FDA in the first direction, e.g., x-axis direction, may be smaller than the length in the second direction, e.g., y-axis direction. In addition, the length of the first non-folding area NFA1 in the first direction, e.g., x-axis direction, may be larger than the length of the folding area FDA in the first direction, e.g., x-axis direction. The length of the second non-folding area NFA2 in the first direction, e.g., x-axis direction, may be larger than the length of the folding area FDA in the first direction, e.g., x-axis direction.

The first display area DA1 may be disposed on the front side of the display device 10. The first display area DA1 may overlap the folding area FDA, the first non-folding area NFA1, and the second non-folding area NFA2. Therefore, when the display device 10 is unfolded, images may be displayed on the front side of the folding area FDA, the first non-folding area NFA1 and the second non-folding area NFA2 of the display device 10.

The second display area DA2 may be disposed on the rear side of the display device 10. The second display area DA2 may overlap the second non-folding area NFA2. Therefore, when the display device 10 is folded, images may be displayed on the front side of the second non-folding area NFA2 of the display device 10.

Although the through hole TH where a camera SDA or the like is formed is located in the first non-folding area NFA1 in FIGS. 18 and 19, the present disclosure is not limited thereto. The through hole TH or the camera SDA may be located in the second non-folding area NFA2 or the folding area FDA.

Figure 20:
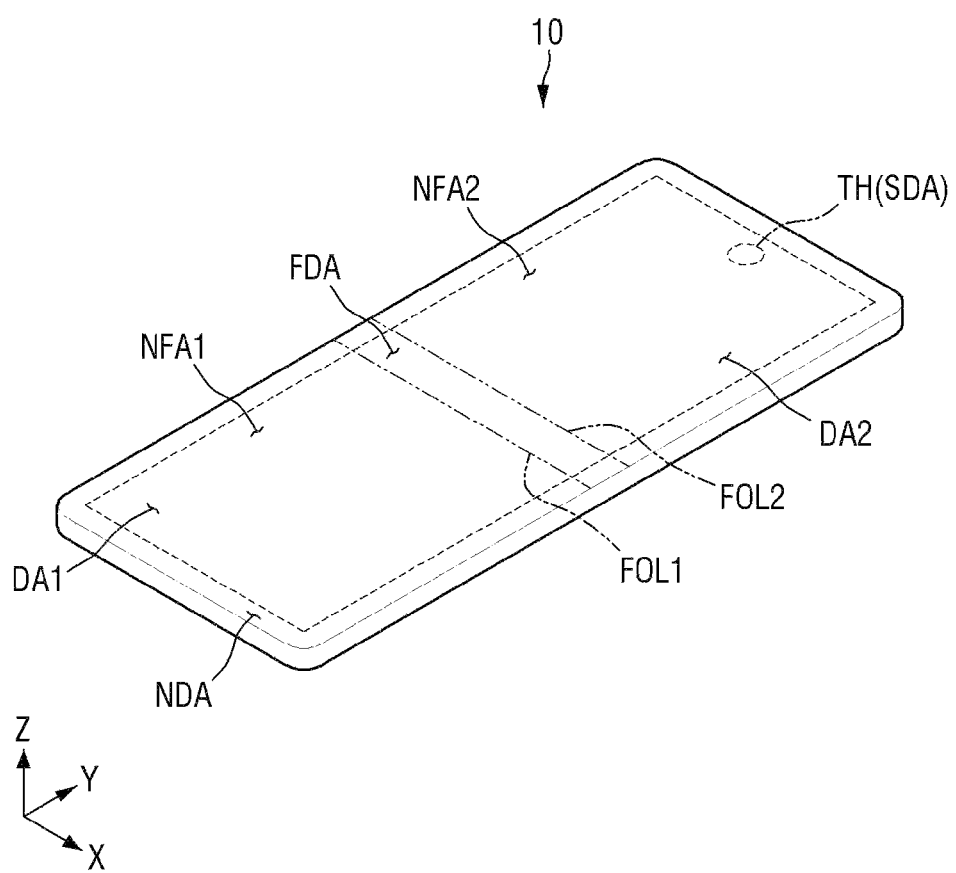
FIGS. 20 and 21 are perspective views showing a display device according to an embodiment of the present disclosure.
Figure 21:
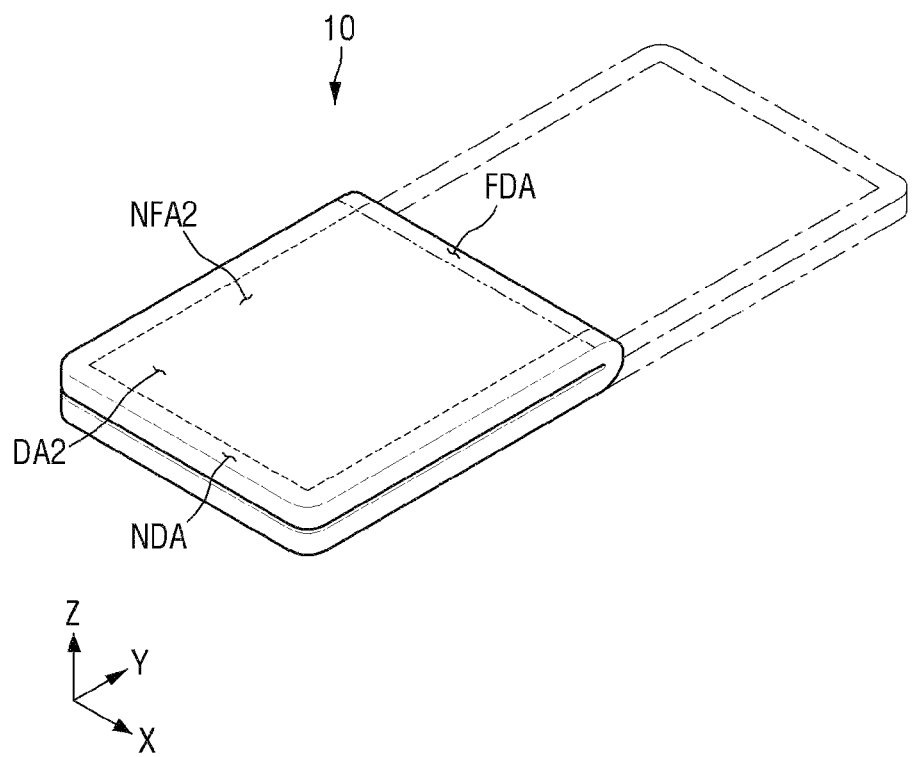

FIGS. 20 and 21 are perspective views showing a display device 10 according to an embodiment of the present disclosure.

In the example shown in FIGS. 20 and 21, a display device 10 is a foldable display device that is folded in the second direction, e.g., y-axis direction. The display device 10 may remain folded as well as unfolded. The display device 10 may be folded inward (in-folding manner) such that the front surface is located inside. When the display device 10 is bent or folded in the in-folding manner, a part of the front surface of the display device 10 may face the other part of the front surface. Alternatively, the display device 10 may be folded outward (out-folding manner) such that the front surface is located outside. When the display device 10 is bent or folded in the out-folding manner, a part of the rear surface of the display device 10 may face the other part of the rear surface.

The display device 10 may include a folding area FDA, a first non-folding area NFA1, and a second non-folding area NFA2. The display device 10 can be folded at the folding area FDA, while it cannot be folded at the first non-folding area NFA1 and the second non-folding area NFA2. The first non-folding area NFA1 may be disposed on one side, for example, the lower side of the folding area FDA. The second non-folding area NFA2 may be disposed on the other side, for example, the upper side of the folding area FDA.

The touch sensing unit TSU according to the embodiment of the present disclosure may be formed and disposed on each of the first non-folding area NFA1 and the second non-folding area NFA2.

The folding area FDA may be an area bent with a predetermined curvature over the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may be extended in the first direction, e.g., x-axis direction, as shown in FIGS. 20 and 21, and the display device 10 may be folded in the second direction, e.g., y-axis direction. As a result, the length of the display device 10 in the second direction, e.g., the y-axis direction, may be reduced to about half, so that the display device 10 is easy to carry.

The direction in which the first folding line FOL1 and the second folding line FOL2 are extended is not limited to the first direction, e.g., x-axis direction. For example, the first folding line FOL1 and the second folding line FOL2 may be extended in the second direction, e.g., y-axis direction, and the display device 10 may be folded in the first direction, e.g., x-axis direction. In such case, the length of the display device 10 in the first direction, e.g., x-axis direction, may be reduced to about half. Alternatively, the first folding line FOL1 and the second folding line FOL2 may be extended in a diagonal direction of the display device 10 between the first direction, e.g., x-axis direction, and the second direction, e.g., y-axis direction. In such case, the display device 10 may be folded in a triangle shape.

When the first folding line FOL1 and the second folding line FOL2 are extended in the first direction, e.g., x-axis direction, as shown in FIGS. 20 and 21, the length of the folding area FDA in the second direction, e.g., y-axis direction, may be smaller than the length in the first direction, e.g., x-axis direction. In addition, the length of the first non-folding area NFA1 in the second direction, e.g., y-axis direction, may be larger than the length of the folding area FDA in the second direction, e.g., y-axis direction. The length of the second non-folding area NFA2 in the second direction, e.g., y-axis direction, may be larger than the length of the folding area FDA in the second direction, e.g., y-axis direction.

The first display area DA1 may be disposed on the front side of the display device 10. The first display area DA1 may overlap the folding area FDA, the first non-folding area NFA1, and the second non-folding area NFA2. Therefore, when the display device 10 is unfolded, images may be displayed on the front side of the folding area FDA, the first non-folding area NFA1 and the second non-folding area NFA2 of the display device 10.

The second display area DA2 may be disposed on the rear side of the display device 10. The second display area DA2 may overlap the second non-folding area NFA2. Therefore, when the display device 10 is folded, images may be displayed on the front side of the second non-folding rea NFA2 of the display device 10.

Although the through hole TH where the camera SDA or the like is disposed is located in the second non-folding area NFA2 in FIGS. 20 and 21, the present disclosure is not limited thereto. The through hole TH may be located in the first non-folding area NFA1 or the folding area FDA. In concluding the detailed description, those skilled in the art will appreciate that many variations and modifications can be made to the embodiments without substantially departing from the principles of the inventive concept. Therefore, the disclosed embodiments used in a generic and descriptive sense only and not for purposes of limitation.

What is claimed is:

1. A display device comprising:
a display panel comprising an image display area and a non-display area;
display pixels comprising light-emitting elements in the image display area and pixel driving units connected to the light-emitting elements;
light-sensing pixels comprising photo-detecting units in a fingerprint sensing area in the image display area, and sense driving units connected to the photo-detecting units;
a light-sensing reset driver configured to supply reset signals to the sense driving units of the light-sensing pixels for at least each horizontal line among the light-sensing pixels in response to a line select signal from a display driving circuit;
a fingerprint scan driver configured to sequentially supply a fingerprint scan signal to the sense driving units of the light-sensing pixels in response to a fingerprint scan control signal from the display driving circuit; and
a fingerprint driving circuit configured to perform analog-digital conversion at least every frame on light-sensing signals or sensing voltages input through fingerprint sensing lines connected to the sense driving units, respectively, to generate light-sensing data, and recognize a fingerprint using the light-sensing data,
wherein the fingerprint driving circuit samples the light-sensing data for at least one frame from the light-sensing data for a plurality of frame periods for each horizontal line, detects the sampling sensing data, and authenticates a fingerprint by combining the sampling sensing data for each horizontal line,
wherein the fingerprint driving circuit divides the fingerprint sensing area in the image display area into a plurality of divided areas, calculates averages of data values of the light-sensing data or sampling sensing data for the divided areas, and combines the averages of the data values for each horizontal line to authenticate a fingerprint.

2. The display device of claim 1, wherein the light-sensing reset driver sequentially supplies the reset signals to the sense driving units of the light-sensing pixels for at least each horizontal line in response to the line select signals input during a blank period of at least one frame period.

3. The display device of claim 2, wherein the sense driving units simultaneously reset the light-sensing pixels for at least each horizontal line in response to reset signals input from the light-sensing reset driver at least every frame, and connect fingerprint connection lines connected to the light-sensing pixels with sensing lines in response to the fingerprint scan signal.

4. The display device of claim 2, wherein the sense driving units reset the light-sensing pixels electrically connected thereto to a reset voltage in response to the reset signal input for at least each horizontal line, and drive the light-sensing pixels so that the light-sensing pixels output light-sensing signals in response to the fingerprint scan signal during a plurality of frame periods until a next reset signal is input.

5. The display device of claim 2, wherein each of the sense driving units comprises
a first sensing transistor configured to allow a light-sensing signal to flow according to a light-sensing current according to voltages of a photo-detecting element and a sensing capacitor of the photo-detecting unit;

a second sensing transistor configured to control the light-sensing signal from the first sensing transistor to be transmitted to a fingerprint sensing line in response to the fingerprint scan signal; and a third sensing transistor configured to reset the voltages of the photo-detecting element and the sensing capacitor to a reset voltage of a reset voltage source in response to the reset signal.

6. The display device of claim 5, wherein second sensing transistors connected to a $p^{th}$ fingerprint scan line among a plurality of fingerprint scan lines connect the photo-detecting units arranged in a $(4n-3)^{th}$ horizontal line with respective fingerprint sensing lines in response to a $p^{th}$ fingerprint scan signal, wherein second sensing transistors connected to a $(p+1)^{th}$ fingerprint scan line among the plurality of fingerprint scan lines connect the photo-detecting units arranged in a $(4n-2)^{th}$ horizontal line with respective fingerprint sensing lines in response to a $(p+1)^{th}$ fingerprint scan signal, wherein second sensing transistors connected to a $(p+2)^{th}$ fingerprint scan line among the plurality of fingerprint scan lines connect the photo-detecting units arranged in a $(4n-1)^{th}$ horizontal line with respective fingerprint sensing lines in response to a $(p+2)^{th}$ fingerprint scan signal, and wherein second sensing transistors connected to a $(p+3)^{th}$ fingerprint scan line among the plurality of fingerprint scan lines connect the photo-detecting units arranged in a $4n^{th}$ horizontal line with respective fingerprint sensing lines in response to a $(p+3)^{th}$ fingerprint scan signal.

7. The display device of claim 2, wherein the light-sensing reset driver comprises first to $n^{th}$ multiplexers, and wherein each of the first to $n^{th}$ multiplexers is connected to $(4n-3)^{th}$ to $4n^{th}$ fingerprint reset lines connected to the sense driving units, and sequentially apply the reset signals to the $(4n-3)^{th}$ to $4n^{th}$ fingerprint reset lines in response to the line select signal.

8. The display device of claim 7, wherein the display driving circuit supplies the line select signal to the first to $n^{th}$ multiplexers at least every frame period, and wherein the line select signal is a digital signal that sequentially selects the $(4n-3)^{th}$ to $4n^{th}$ fingerprint reset lines in each blank period of the at least one frame period.

9. The display device of claim 8, wherein the first to $n^{th}$ multiplexers sequentially supply the $(4n-3)$ to $4n^{th}$ reset signals to the $(4n-3)$ to $4n^{th}$ fingerprint reset lines in response to the line select signal sequentially input for each blank period of the at least one frame period.

10. The display device of claim 8, wherein the sense driving units are connected to the $(4n-3)^{th}$ to $4n^{th}$ fingerprint reset lines for each horizontal line, reset the light-sensing pixels electrically connected thereto to a reset voltage in response to the $(4n-3)^{th}$ to $4n^{th}$ reset signals input for each horizontal line, and drive the light-sensing pixels so that they output light-sensing signals in response to the fingerprint scan signal during a plurality of frame periods until a next reset signal is input.

11. The display device of claim 2, wherein the light-sensing reset driver comprises first to $n^{th}$ multiplexers, and wherein each of the first to $n^{th}$ multiplexers is connected to $(6n-5)^{th}$ to $6n^{th}$, $(8n-7)^{th}$ to $8n^{th}$, $(10n-9)^{th}$ to $10n^{th}$, $(12n-11)^{th}$ to $12n$, $(14n-13)^{th}$ to $14n^{th}$, or $(16n-15)^{th}$ to $16n^{th}$ fingerprint reset lines connected to the sense driving units, and sequentially applies the reset signals to the $(6n-5)^{th}$ to the $6n^{th}$, the $(8n-7)^{th}$ to the $8n^{th}$, the $(10n-9)^{th}$ to the $10n^{th}$, the $(12n-11)^{th}$ to the $12n^{th}$, the $(14n-13)^{th}$ to the $14n^{th}$, or the $(16n-15)^{th}$ to the $16n^{th}$ fingerprint reset lines in response to the line select signal.

12. The display device of claim 11, wherein the display driving circuit supplies the line select signal to the first to $n^{th}$ multiplexers at least every frame period, and wherein the line select signal is a digital signal that sequentially selects the $(6n-5)^{th}$ to the $6n^{th}$, the $(8n-7)^{th}$ to the $8n^{th}$, the $(10n-9)^{th}$ to the $10n^{th}$, the $(12n-11)^{th}$ to the $12n^{th}$, the $(14n-13)^{th}$ to the $14n^{th}$, or the $(16n-15)^{th}$ to the $16n^{th}$ fingerprint reset lines in each blank period of the at least one frame period.

13. The display device of claim 12, wherein the sense driving units are connected to the $(6n-5)^{th}$ to the $6n^{th}$, the $(8n-7)^{th}$ to the $8n^{th}$, the $(10n-9)^{th}$ to the $10n^{th}$, the $(12n-11)^{th}$ to the $12n^{th}$, the $(14n-13)^{th}$ to the $14n^{th}$, or the $(16n-15)^{th}$ to the $16n^{th}$ fingerprint reset lines for each horizontal line, reset the light-sensing pixels electrically connected thereto to a reset voltage in response to the $(6n-5)^{th}$ to the 6nth, the $(8n-7)^{th}$ to the $8n^{th}$, the $(10n-9)^{th}$ to the $10n^{th}$, the $(12n-11)^{th}$ to the $12n^{th}$, the $(14n-13)^{th}$ to the $14n^{th}$, or the $(16n-15)^{th}$ to the $16n^{th}$ reset signals input for each horizontal line, and drive the light-sensing pixels so that they output light-sensing signals in response to the fingerprint scan signal during a plurality of frame periods until a next reset signal is input.

14. The display device of claim 1, wherein the light-sensing reset driver sequentially supplies the reset signals to the sense driving units of the light-sensing pixels for at least each horizontal line in response to the line select signals input during a blank period of at least one frame period.

15. The display device of claim 1, wherein the light-sensing reset driver comprises first to $n^{th}$ multiplexers, and wherein each of the first to $n^{th}$ multiplexers is connected to $(4n-3)^{th}$ to $4^{th}$, $(6n-5)^{th}$ to $6n^{th}$, $(8n-7)^{th}$ to $8n^{th}$, $(10n-9)^{th}$ to $10n^{th}$, $(12n-11)^{th}$ to $12n^{th}$, $(14n-13)^{th}$ to $14n^{th}$, or $(16n-15)^{th}$ to $16n^{th}$ fingerprint reset lines connected to the sense driving units, and sequentially applies the reset signals to the $(4n-3)^{th}$ to the $4^{th}$, the $(6n-5)^{th}$ to the $6n^{th}$, the $(8n-7)^{th}$ to the $8n^{th}$, the $(10n-9)^{th}$ to the $10n^{th}$, the $(12n-11)^{th}$ to the $12n^{th}$, the $(14n-13)^{th}$ to the $14n^{th}$, or the $(16n-15)^{th}$ to the $16n^{th}$ fingerprint reset lines in response to the line select signal.

16. The display device of claim 15, wherein the display driving circuit supplies the line select signal to the first to $n^{th}$ multiplexers at least every frame period, and wherein the line select signal is a digital signal that sequentially selects the $(4n-3)^{th}$ to the 4th, the $(6n-5)^{th}$ to the $6n^{th}$, the $(8n-7)^{th}$ to the $8n^{th}$, the $(10n-9)^{th}$ to the $10n^{th}$, the $(12n-11)^{th}$ to the $12n^{th}$, the $(14n-13)^{th}$ to the $14n^{th}$, or the $(16n-15)^{th}$ to the $16n^{th}$ fingerprint reset lines in each blank period of the at least one frame period.

17. The display device of claim 16, wherein the sense driving units are connected to the $(4n-3)^{th}$ to the 4th, the $(6n-5)^{th}$ to the $6n^{th}$, the $(8n-7)^{th}$ to the $8n^{th}$, the $(10n-9)^{th}$ to the $10n^{th}$, the $(12n-11)^{th}$ to the $12n^{th}$, the $(14n-13)^{th}$ to the $14n^{th}$, or the $(16n-15)^{th}$ to the $16n^{th}$ fingerprint reset lines for each horizontal line, reset the light-sensing pixels electrically connected thereto to a reset voltage in response to the $(4n-3)^{th}$ to the 4th, the $(6n-5)^{th}$ to the $6n^{th}$, the $(8n-7)^{th}$ to the $8n^{th}$, the $(10n-9)^{th}$ to the $10n^{th}$, the $(12n-11)^{th}$ to the $12n^{th}$, the $(14n-13)^{th}$ to the $14n^{th}$, or the $(16n-15)^{th}$ to the $16n^{th}$ reset signals input for each horizontal line, and drive the light-sensing pixels so that they output light-sensing signals in response to the fingerprint scan signal during a plurality of frame periods until a next reset signal is input.

18. An electronic device comprising a display device, the display device comprising:
- a display panel comprising an image display area and a non-display area;
- display pixels comprising light-emitting elements in the image display area and pixel driving units connected to the light-emitting elements;
- light-sensing pixels comprising photo-detecting units in a fingerprint sensing area in the image display area, and sense driving units connected to the photo-detecting units;
- a light-sensing reset driver configured to supply reset signals to the sense driving units of the light-sensing pixels for at least each horizontal line among the light-sensing pixels in response to a line select signal from a display driving circuit;
- a fingerprint scan driver configured to sequentially supply a fingerprint scan signal to the sense driving units of the light-sensing pixels in response to a fingerprint scan control signal from the display driving circuit; and
- a fingerprint driving circuit configured to perform analog-digital conversion at least every frame on light-sensing signals or sensing voltages input through fingerprint sensing lines connected to the sense driving units, respectively, to generate light-sensing data, and recognize a fingerprint using the light-sensing data,
- wherein the fingerprint driving circuit samples the light-sensing data for at least one frame from the light-sensing data for a plurality of frame periods for each horizontal line, detects the sampling sensing data, and authenticates a fingerprint by combining the sampling sensing data for each horizontal line,
- wherein the fingerprint driving circuit divides the fingerprint sensing area in the image display area into a plurality of divided areas, calculates averages of data values of the light-sensing data or sampling sensing data for the divided areas, and combines the averages of the data values for each horizontal line to authenticate a fingerprint.

\* \* \* \* \*